(12) United States Patent
Melander et al.

(10) Patent No.: US 10,548,050 B2
(45) Date of Patent: Jan. 28, 2020

(54) SERVICE LEVEL AGREEMENT IN RADIO BASE STATION

(71) Applicant: Telefonaktiebolaget LM Ericsson (publ), Stockholm (SE)

(72) Inventors: Ola Melander, Wuerselen (DE); Branko Djordjevic, Herzogenrath (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/750,701

(22) PCT Filed: Aug. 11, 2016

(86) PCT No.: PCT/EP2016/069174
§ 371 (c)(1),
(2) Date: Feb. 6, 2018

(87) PCT Pub. No.: WO2017/029198
PCT Pub. Date: Feb. 23, 2017

(65) Prior Publication Data
US 2018/0227792 A1 Aug. 9, 2018

(51) Int. Cl.
*G06F 15/173* (2006.01)
*H04W 4/00* (2018.01)
*H04L 12/801* (2013.01)
*H04W 28/24* (2009.01)
*H04W 4/70* (2018.01)
(Continued)

(52) U.S. Cl.
CPC ......... *H04W 28/24* (2013.01); *H04L 41/5019* (2013.01); *H04M 15/8016* (2013.01);
(Continued)

(58) Field of Classification Search
CPC ..... H04L 41/5019; H04L 47/10; H04L 41/12; H04M 15/8016; H04W 24/08;
(Continued)

(56) References Cited

U.S. PATENT DOCUMENTS 8,392,558 B1 * 3/2013 Ahuja .................... G06F 9/505
709/223
8,989,091 B2 * 3/2015 Muhanna ................ H04W 4/70
370/328

(Continued)

OTHER PUBLICATIONS

Telefon AB LM Ericsson, "M2M Service Enablement", ETSI M2M(12) 19-076, Mar. 8, 2012, pp. 1-10.
(Continued)

*Primary Examiner* — Edan Orgad
*Assistant Examiner* — Vanneilian Lalchinthang
(74) *Attorney, Agent, or Firm* — Patent Portfolio Builders, PLLC

(57) ABSTRACT

The present disclosure generally relates to the field of service delivery. More specifically, the present disclosure relates to a technique of supporting provisioning of a service from a wireless communication network associated with an operator to one or more end devices. A method embodiment comprises agreeing, between the one or more end devices (20) and a support system (200) of the wireless communication network (10), on providing a service with target performance characteristics to the one or more end devices (20), the service being requested by the one or more end devices (20) to be provided with desired performance characteristics to the one or more end devices (20) and the target performance characteristics being dependent on the desired performance characteristics and performance characteristics measurements associated with the one or more network entities (100); and providing, by the one or more network entities (100), the service with the target performance characteristics to the one or more end devices (20).

29 Claims, 18 Drawing Sheets

(51) Int. Cl.
*H04M 15/00* (2006.01)
*H04W 24/10* (2009.01)
*H04W 28/02* (2009.01)
*H04L 12/24* (2006.01)
*H04W 24/08* (2009.01)

(52) U.S. Cl.
CPC ............ *H04W 4/70* (2018.02); *H04W 24/08* (2013.01); *H04W 24/10* (2013.01); *H04W 28/0268* (2013.01)

(58) Field of Classification Search
CPC . H04W 24/10; H04W 28/0268; H04W 28/24; H04W 4/70; H04W 4/005; H04W 92/00; H04W 80/04; H04W 84/18; G06F 9/505
USPC .......................................................... 370/235
See application file for complete search history.

(56) References Cited

U.S. PATENT DOCUMENTS

| | | | |
|---|---|---|---|
| 2006/0265499 A1* | 11/2006 | Menasce | G06Q 10/06 709/225 |
| 2007/0025264 A1 | 2/2007 | Cheng et al. | |
| 2010/0091671 A1 | 4/2010 | Lidstrom et al. | |
| 2013/0017827 A1* | 1/2013 | Muhanna | H04W 4/70 455/426.1 |
| 2013/0212236 A1* | 8/2013 | Foti | H04W 4/70 709/221 |
| 2014/0301192 A1* | 10/2014 | Lee | H04L 47/10 370/230 |
| 2015/0156082 A1 | 6/2015 | Kakadia et al. | |
| 2015/0249901 A1* | 9/2015 | Muhanna | H04W 4/70 455/426.1 |
| 2015/0281004 A1* | 10/2015 | Kakadia | H04L 41/147 370/235 |
| 2015/0348065 A1* | 12/2015 | Doganata | G06Q 30/0202 705/7.31 |
| 2016/0314029 A1* | 10/2016 | Gupta | G06F 9/545 |

OTHER PUBLICATIONS

Office Action issued in application No. 16750841.5; dated Mar. 5, 2019; 6 pages.

* cited by examiner

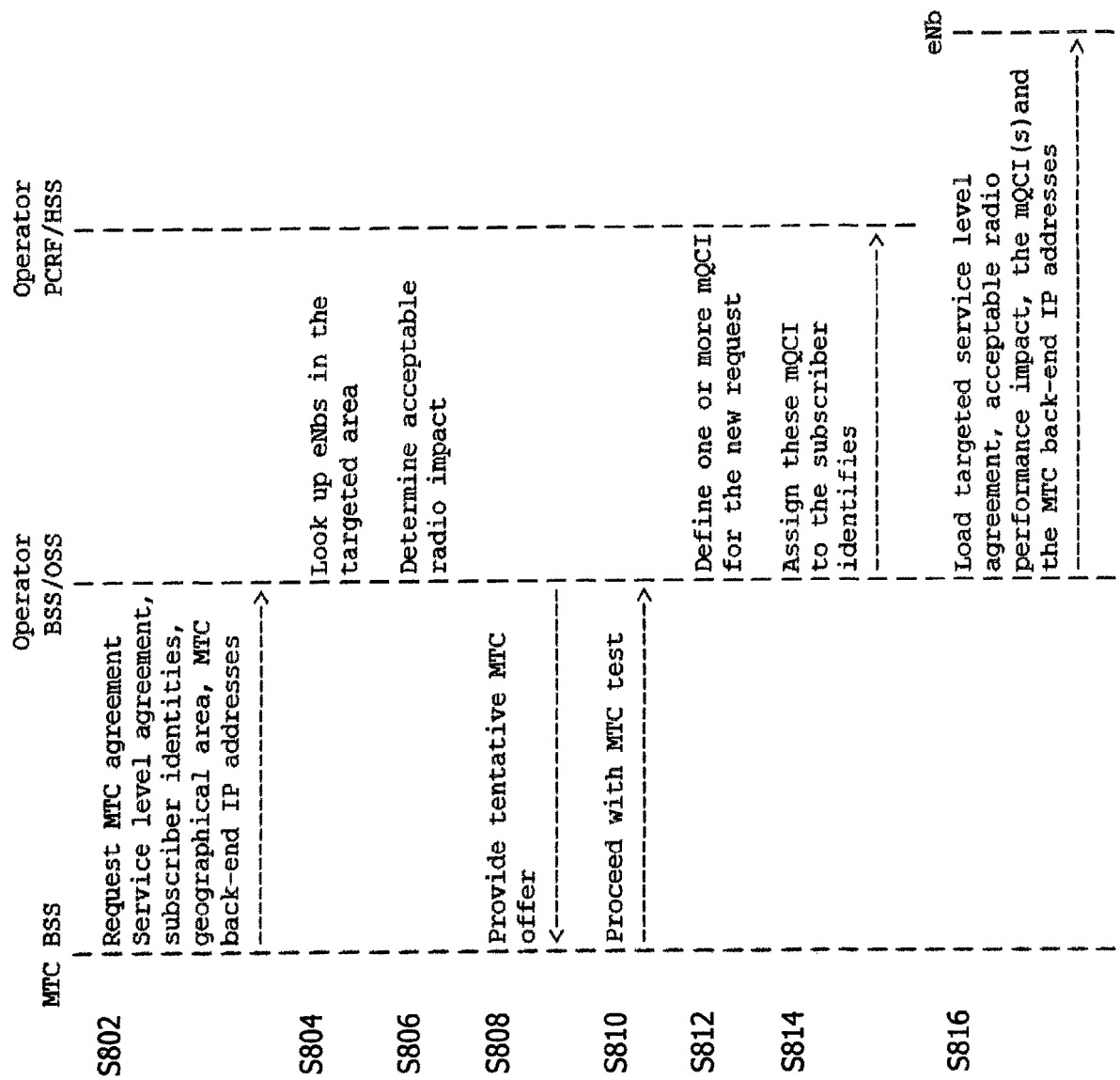

SERVICE LEVEL AGREEMENT IN RADIO BASE STATION

TECHNICAL FIELD

The present disclosure generally relates to the field of service delivery. More specifically, the present disclosure relates to a technique of supporting provisioning of a service from a wireless communication network associated with an operator to one or more end devices.

BACKGROUND

Machine type of communication (MTC) is a growth area related to the Internet of Things (IoT). The IoT can be considered a network of physical objects or "things" embedded with electronics, software, sensors, and connectivity to enable objects to exchange data with a manufacturer, operator and/or other connected devices based on the infrastructure of International Telecommunication Union's Global Standards Initiative. The IoT allows objects to be sensed and controlled remotely across existing network infrastructure, creating opportunities for more direct integration between the physical world and computer-based systems, and resulting in improved efficiency, accuracy and economic benefit. Each thing is uniquely identifiable through its embedded computing system but is able to interoperate within the existing Internet infrastructure. Typically, the IoT is expected to offer advanced connectivity of devices, systems, and services that goes beyond machine-to-machine communications (M2M) and covers a variety of protocols, domains, and applications. Things, in the IoT, can refer to a wide variety of devices such as heart monitoring implants, bio-chip transponders on farm animals, electric clams in coastal waters, automobiles with built-in sensors, field operation devices that assist fire-fighters in search and rescue, or robots communicating on an automated production line. These devices collect useful data with the help of various existing technologies and then autonomously flow the data between other devices. Current market examples include smart thermostat systems and washer/dryers that utilize Wi-Fi/WiFi for remote monitoring, wide area metering read out via Global System for Mobile Communications (GSM) networks, or fleet management via Wideband Code Division Multiple Access (WCDMA) networks.

In general, mobile service providers want to get revenue through offering their mobile broadband networks as the communication channel to enterprises. Regarding MTC, mobile service providers intend to get new revenue from this area through offering their mobile broadband networks as the communication channel to enterprises that have an MTC need. This drives mobile broadband demand. Mobile operators thus enhance existing and coming mobile network technologies (like General Packet Radio Service (GPRS)/Enhanced Data Rates for GSM Evolution (Edge), WCDMA, Long Term Evolution (LTE), 5G, WiFi etc.) with functionality facilitating MTC. The 3GPP/WiFi accesses are enhanced with gateway-based capillary type of accesses extending the supported MTC communication to low power Z-Wave, ZigBee, Bluetooth, IPv6 over Low power Wireless Personal Area Network (6LoWPAN) devices and the like.

The current mobile operator focus is on running a mass market smartphone network, directly addressing consumers. In the cases mobile operators provide communication to enterprises, the corner stone remains the voice and smartphone communication to the enterprises' employees. A mobile operator faces obstacles when increasing income by broadly offering MTC to enterprises.

For example, an enterprise has a thorough understanding of what type of communication is required and the location where it is required. However, the mobile operator has no knowledge what service level agreement (e.g., achievable speed, latency, jitter, packet drop rate etc.) the mobile network offers at the requested locations. As long as the mobile operator does not know, the mobile operator cannot commit to and charge for a service level agreement. This problem applies to both MTC and normal communication services.

Further, the mobile operator lacks the resources to find out the network capabilities at the requested locations. If these resources are built up, the mobile operator moves away from mass market MTC offerings and the resource cost to assess the communication channel removes the mobile operator value of the MTC offering, with the exception of a few sufficiently large MTC contracts that can justify the additional resources.

SUMMARY

Accordingly, there is a need for an improved technique for supporting provisioning of a service from a wireless communication network associated with an operator to one or more end devices.

According to a first aspect, a method of supporting provisioning of a service from a wireless communication network associated with an operator to one or more end devices is provided. The method comprises receiving, by a support system of the wireless communication network, a service request. The service request requests a service to be provided with desired performance characteristics to the one or more end devices. The method further comprises instructing, by the support system, one or more network entities of the wireless communication network to provide the service with target performance characteristics to the one or more end devices. The target performance characteristics are dependent on the desired performance characteristics and performance characteristics measurements associated with the one or more network entities.

The service may comprise any type of communication including but not limited to voice communication and data communication. The wireless communication network may make use of various mobile network technologies including but not limited to GPRS/Edge, Universal Mobile Telecommunications System (UMTS), WCDMA, LTE, LTE-Advanced (LTE-A), 5G, WiFi, Wireless Local Area Network (WLAN) and a combination thereof.

The service may be or comprise a defined service. A defined service or reliable service may be understood as a service for which a (well-) defined service level agreement exists for the end user. Best effort type of services may exist in parallel without being subject to the method described herein. Best-effort delivery may be considered to describe a network service in which the network does not provide any guarantees that data is delivered or that a user is given a guaranteed quality of service level or a certain priority. In a best-effort network all users usually obtain best-effort service. This may be understood to mean that all users obtain an unspecified variable bit rate and delivery time, depending on the current traffic load. This can be contrasted with reliable delivery as mentioned above, which may be built on top of best-effort delivery (possibly without latency and throughput guarantees), or with circuit switching schemes which maintain a defined, continuous quality of service.

The wireless communication network is associated with an operator. The operator may generally be a network operator. The operator may comprise or be a service provider. The service provider may be regarded as a network operator acting as a mobile network service provider, or an Information Technology (IT) department inside an enterprise taking the same or a similar role for a private network.

The service is requested to be provided to the one or more end devices with desired performance characteristics. The desired performance characteristics may be understood as a certain level of quality or performance that is desired or preferred by the one or more end devices. For example, the desired performance characteristics may be understood as a certain level of quality or performance with which the one or more end devices wish to receive certain communication services such as data and/or voice communication services.

In general, the term performance characteristics may be understood as a single value for a certain level of quality or performance. Alternatively, the term performance characteristics may be understood as a range of values for a certain level of quality or performance. The desired performance characteristics may thus be understood as a certain range of quality levels or performance levels that are desired or preferred by the one or more end devices. For example, the desired performance characteristics may be understood as a certain range of quality levels or performance levels with which the one or more end devices wish to receive certain communication services such as data and/or voice communication services.

The support system instructs one or more network entities of the wireless communication network to provide the service with target performance characteristics to the one or more end devices. In consequence, the service is provided to the one or more end devices with the target performance characteristics.

The target performance characteristics may be understood as a certain level of quality or performance that can be achieved. Alternatively, the target performance characteristics may be understood as a certain range of quality levels or performance levels that are achievable. For example, the target performance characteristics may be understood as a certain range of quality levels or performance levels which the support system may achieve or be capable to achieve in order to provide the one or more end devices with certain communication services such as data and/or voice communication services.

The target performance characteristics may correspond to the desired performance characteristics. Alternatively, the target performance characteristics may at least partially differ from the desired performance characteristics. The latter may be the case if the support system is aware or determines that it is not capable of or does not want to provide the service with the desired performance characteristics but with differing target performance characteristics.

The support system may take the decision to provide the service with the target performance characteristics that correspond to or that are different from the desired performance characteristics by considering the performance characteristics measurements. In consequence, the method may comprise determining, by the support system, the target performance characteristics based on the desired performance characteristics and the performance characteristics measurements. The support system may derive from the performance characteristics measurements that the service can be provided with target performance characteristics that correspond to the desired performance characteristics. Thus, the service can be provided with the target performance characteristics corresponding to the desired performance characteristics. Alternatively, the support system may derive from the performance characteristics measurements that the service can be provided with target performance characteristics that differ from the desired performance characteristics. Thus, the service can be provided with the target performance characteristics differing from the desired performance characteristics. In summary, the performance measurement characteristics may be taken into account by the support system in order to evaluate whether it can provide the service with target performance characteristics that at least partially correspond to the desired performance characteristics or with target performance characteristics that at least partially differ from the desired performance characteristics.

The method may comprise, upon receipt of the service request, locating the one or more network entities that are to provide the service. The service request may comprise the number of end devices to which the service is to be provided. Alternatively or additionally, the service request may comprise a geographical area for which the service is to apply. Alternatively or additionally, the service request may comprise the Internet Protocol (IP) addresses of a back-end system of the one or more end devices. For example, at least one of the number of end devices to which the service is to be provided, the geographical area for which the service is to apply and the IP addresses of a back-end system of the one or more end device may be considered by the support system to locate the one or more network entities that are to provide the service.

The method may comprise requesting, by the support system, the one or more network entities to report if the target performance characteristics are achieved. The method may comprise requesting, by the support system, the one or more network entities to report information indicating why the target performance characteristics were not achieved. The information indicating why the target performance characteristics were not achieved may be reported together with the report if the target performance characteristics are achieved, e.g. in case the report indicates that the target performance characteristics were not achieved. The method may comprise assessing, by the support system, radio resource utilization in the one or more network entities.

The method may comprise associating, by the support system, the target performance characteristics with a pricing level to be charged for the provision of the service with the target performance characteristics. In order to charge for the provision of the service with the target performance characteristics, the support system may consider if and/or for how long the target performance characteristics have been achieved. For example, the support system may consider if and/or for how long the target performance characteristics have been achieved as reported by the one or more network entities. The support system may consider or report a fulfillment success ratio or ratio of target performance characteristics achievement per end device or aggregated over end devices. The fulfillment success ratio may include information indicating how well the target performance characteristics were achieved per end device and/or aggregated over multiple end devices, and/or the reason what limits that the target performance characteristics are/were fulfilled (which reasons prevent the target performance characteristics to be achieved). This may be considered some kind of root cause analysis. This may enable the operator to understand which measures enable fulfillment of the target performance characteristics with a high likelihood or with a high level or value, e.g. by providing one more base stations of a certain frequency.

The method may comprise defining, by the support system, one or more Quality of Service (QoS) Class Identifier (QCI) values to be used for the target performance characteristics. The method may comprise allocating, by the support system, one or more QCI values to be used for the target performance characteristics.

According to a second aspect, a method of providing a service from a wireless communication network associated with an operator to one or more end devices is provided. The method comprises receiving, by one or more network entities of the wireless communication network, an instruction to provide a service with target performance characteristics to the one or more end devices. The service is requested by the one or more end devices to be provided with desired performance characteristics to the one or more end devices. The target performance characteristics are dependent on the desired performance characteristics and performance characteristics measurements associated with the one or more network entities. The method further comprises providing, by the one or more network entities, the service with the target performance characteristics to the one or more end devices.

The method may comprise, before performing the step of providing the service with the target performance characteristics, performing, by the one or more network entities, the performance characteristics measurements.

The step of performing the performance characteristics measurements may comprise carrying out the performance characteristics measurements by the one or more network entities. Alternatively or additionally, the method may comprise instructing, by the one or more network entities, the one or more end devices to carry out the performance characteristics measurements. The performance characteristics measurements may be reported, by the one or more network entities, to the support system. Further, information indicating what limits that the target performance characteristics are/were achieved (what prevents the target performance characteristics to be achieved) may be reported, by the one or more network entities, to the support system.

The method may comprise reporting, by the one or more network entities, achieved performance characteristics of the one or more end devices served by the one or more network entities. The foregoing may be performed after the service has been provided, by the one or more network entities, with the target performance characteristics to the one or more end devices. The achieved performance characteristics may be taken into account by the support system in order to evaluate if and, if so, for how long, the achieved performance characteristics correspond to the target performance characteristics. Further, the information indicating what limits that the target performance characteristics are/were achieved (e.g. information indicating the root cause for performance characteristics deviations) may be taken into account by the support system. For example, the information indicating what limits that the target performance characteristics are/were achieved (information indicating which reasons prevent the target performance characteristics to be achieved) may be taken into account by the support system in order to evaluate if and, if so, for how long, the achieved performance characteristics correspond to the target performance characteristics and/or which measures may be taken by the support system in order to increase the time period for which the achieved performance characteristics correspond to the target performance characteristics.

The method may comprise determining, by the one or more network entities, whether achieved performance characteristics correspond to the target performance characteristics. The achieved performance characteristics may be determined after the service has been provided, by the one or more network entities, with the target performance characteristics to the one or more end devices. The result of the determination whether the achieved performance characteristics correspond to the target performance characteristics may be reported to the support system. The result of the determination whether the achieved performance characteristics correspond to the target performance characteristics may be taken into account, by the support system, in order to evaluate if and, if so, for how long, the achieved performance characteristics correspond to the target performance characteristics.

The step of determining whether the achieved performance characteristics correspond to the target performance characteristics may comprise monitoring traffic between the one or more network entities and the one or more end devices. The amount of traffic may then be compared to the amount of traffic intended or allowed under the target performance characteristics. It may be repeatedly, e.g. continuously, determined whether the achieved performance characteristics correspond to the target performance characteristics.

If the achieved performance characteristics are lower than the target performance characteristics, the method may comprise prioritizing, by the one or more network entities, the one or more end devices. By prioritizing the one or more end devices the achieved performance characteristics between the one or more end devices and the one or more network entities may be increased so as to eventually reach the target performance characteristics. Prioritizing may involve classical prioritization over other devices e.g. by scheduling the one or more end devices more frequently than the other devices. Prioritization may also be understood as pro-actively acting on the one or more end devices e.g. by moving the one or more end devices from a higher frequency (which may have higher capacity, but worse signal to noise ratio) to a lower frequency (which may have a more robust communication channel) to achieve the target performance characteristics. Further, it may be pro-actively changed to a more robust/more in-efficient coding to reduce the likelihood for radio interface block errors increasing retransmissions or latency. Another option for prioritization may be to aggressively pre-schedule the one or more end devices. Yet another option for prioritization may be to allow more power to/from the one or more end devices to increase signal to noise ratios.

If the achieved performance characteristics are higher than the target performance characteristics, the method may comprise de-prioritizing, by the one or more network entities, the one or more end devices. By de-prioritizing the one or more end devices the achieved performance characteristics between the one or more end devices and the one or more network entities may be decreased so as to eventually reach or lie below the target performance characteristics.

The method may comprise recording, by the one or more network entities, time periods during which the achieved performance characteristics correspond to the target performance characteristics.

The method may comprise reporting the recorded time periods to the support system. The recorded information may be used, by the support system, to determine whether the service has been provided sufficiently long enough with the target performance characteristics. For example, it may be determined that the service has been provided sufficiently long enough with the target performance characteristics if the time periods during which the achieved performance characteristics correspond to the target performance characteristics are, either alone or in sum, longer than a predetermined time period.

Further, according to a first illustrative aspect, a method of providing a service from a wireless communication network associated with an operator to one or more end devices is provided. The method comprises receiving, by one or more network entities of the wireless communication network, an instruction to provide a service with target performance characteristics to the one or more end devices. The service is requested by the one or more end devices to be provided with desired performance characteristics to the one or more end devices. The target performance characteristics is dependent on the desired performance characteristics and performance characteristics measurements associated with the one or more network entities. The method further comprises initiating, by the one or more network entities, to provide, the service with the target performance characteristics to the one or more end devices.

In the method, the one or more network entities may correspond each to a Cloud RAN control node (CRcn) or CRcns.

In the step of initiating, by the one or more network entities, to provide, the service with the target performance characteristics to the one or more end devices, the initiating may be done by specifying latency, jitter and throughput. More specifically, initiating may comprise sending at least one message comprising one or more of informing a further network entity, such as Cloud RAN data handling node (CRdhn), on the acceptable radio impact to achieve a service level agreement, informing the further network entity, such as the CRdhn, on the targeted latency, jitter and throughput for the one or more end devices in the downlink and uplink directions, and instructing the further network entity, such as the CRdhn, to monitor an IP addresses to determine when to supervise the service level agreement. This may be done by sending at least one message with parameters or sending a message so that the CRdhn can obtain parameters from elsewhere.

The method may further comprise receiving, by the one or more network entities, from a further network entity, such as a CRdhn, at least one item of a message informing about an achievable service level agreement specification, a message informing about a radio performance impact report, and a message informing about a fulfillment report for the one or more device.

The method may comprise reporting, by the one or more network entities, achieved performance characteristics of the one or more end devices served by the one or more network entities.

Further, according to a second illustrative aspect, a method of providing a service from a wireless communication network associated with an operator to one or more end devices is provided. The method comprises providing, by one or more network entities of the wireless communication network, the service with the target performance characteristics to the one or more end devices based on an instruction to provide a service with target performance characteristics to the one or more end devices, the service being requested by the one or more end devices to be provided with desired performance characteristics to the one or more end devices and the target performance characteristics being dependent on the desired performance characteristics and performance characteristics measurements associated with the one or more network entities.

In the method, the one or more network entities may correspond each to a Cloud RAN link adaptation and scheduling node (CRlasn).

The method may comprise, before performing the step of providing the service with the target performance characteristics, performing, by the one or more network entities, the performance characteristics measurements.

The step of performing the performance characteristics measurements comprises at least one of carrying out the performance characteristics measurements by the one or more network entities and instructing, by the one or more network entities, the one or more end devices to carry out the performance characteristics measurements.

The method may comprise sending, by the one or more network entities, to a further network entity, such as a CRdhn, at least one item of a message with which information about a radio environment impact due to one or more devices is forwarded (e.g. this message can be sent periodically), a message with which UL data are forwarded and which indicates UL latency, jitter and throughput, and a message indicating the extent to which DL latency, jitter and throughput objectives are met with current radio impact.

The method may comprise receiving, by the one or more network entities, from a further network entity, such as the CRdhn, an item of a message informing to adjust UL link adaptation and scheduling (if needed and when radio conditions allow that), and a message informing about a specification about target latency, jitter, throughput for a next data transmission to/from the one or more devices.

The method may further comprise receiving, by the one or more network entities, from a further network entity such as a CRdhn, forwarded DL data.

Further, according to a third illustrative aspect, a method of providing a service from a wireless communication network associated with an operator to one or more end devices is provided. The method comprises initiating, by one or more network entities of the wireless communication network, to provide, the service with the target performance characteristics to the one or more end devices based on an instruction to provide a service with target performance characteristics to the one or more end devices, the service being requested by the one or more end devices to be provided with desired performance characteristics to the one or more end devices and the target performance characteristics being dependent on the desired performance characteristics and performance characteristics measurements associated with the one or more network entities.

In the method, the one or more network entities may correspond each to a Cloud RAN data handling node (CRdnh).

In the step of initiating, by the one or more network entities, to provide, the service with the target performance characteristics to the one or more end devices, the initiating may be done by specifying latency, jitter and throughput. This may be done by sending at least one message with parameters or sending a message so that the one or mode network entities can obtain parameters from elsewhere. More specifically, initiating may comprise sending, by the one or more network entities, an item of a message informing a further network entity, such as a CRlasn, to adjust UL link adaptation and scheduling (if needed and when radio conditions allow that), and a message informing the further network entity, such as the CRlasn, about a specification about target latency, jitter, throughput for a next data transmission to/from the one or more devices.

The method may comprise receiving, by the one or more network entities, from a further network entity, such as a CRlasn, at least one item of a message with which information about a radio environment impact due to one or more devices is forwarded (e.g. this message can be received periodically), a message with which UL data are forwarded and which indicates UL latency, jitter and throughput, and a message indicating the extent to which DL latency, jitter and throughput objectives are met with current radio impact.

The method may further comprise forwarding, by the one or more network entities, to a further network entity, such as a CRlasn, DL data.

The method may further comprise receiving, by the one or more network entities, from a further network entity such as a CRcn at least one item of a message on the acceptable radio impact to achieve a service level agreement, a message informing on the targeted latency, jitter and throughput for the one or more end devices in the downlink and uplink directions, and instructing to monitor an IP addresses to determine when to supervise the service level agreement.

The method may comprise determining, by the one or more network entities, whether achieved performance characteristics correspond to the target performance characteristics.

The step of determining may comprise monitoring traffic between the one or more network entities and the one or more end devices.

If the achieved performance characteristics are lower than the target performance characteristics, the method may comprise prioritizing, by the one or more network entities, the one or more end devices.

If the achieved performance characteristics are higher than the target performance characteristics, the method may comprise de-prioritizing, by the one or more network entities, the one or more end devices.

The method may comprise recording, by the one or more network entities, time periods during which the achieved performance characteristics correspond to the target performance characteristics.

The method may comprise reporting the recorded time periods.

According to a third aspect, a method of providing a service between a wireless communication network associated with an operator and one or more end devices is provided. The method comprises agreeing, between the one or more end devices and a support system of the wireless communication network, on providing a service with target performance characteristics to the one or more end devices. The service is requested by the one or more end devices to be provided with desired performance characteristics to the one or more end devices. The target performance characteristics are dependent on the desired performance characteristics and performance characteristics measurements associated with the one or more network entities. The method further comprises providing, by the one or more network entities, the service with the target performance characteristics to the one or more end devices.

The step of agreeing may comprise requesting, by the one or more end devices, the service to be provided with desired performance characteristics to the one or more end devices. The step of agreeing may comprise offering, by the support system, to provide the service with target performance characteristics to the one or more end devices. The step of agreeing may comprise accepting, by the one or more end devices, that the service is to be provided with the target performance characteristics.

The steps of requesting and offering may be repeated as long as an agreement or no agreement on the target performance characteristics has been reached. The agreement may be time limited. In consequence, the agreement may be re-negotiated or reviewed at certain times, for example in times of traffic growth and/or price erosion and/or less need to review during network build out and/or increasing prices. The agreement may be repeated periodically (e.g. even if reporting gives short term feedback of actual performance).

For example, the one or more end devices, on the one hand, and the one or more network entities as well as the support system, on the other hand, may negotiate with which level of performance characteristics the service can be provided to the one or more end devices. For this purpose, the one or more end devices may make a request (service is requested to be provided with desired performance characteristics), the support system may determine whether the requested expectations can be met and makes a corresponding offer (the service can be provided with the target performance characteristics that may correspond to or may be different from the desired performance characteristics). If the one or more end devices accept this offer (it is accepted that service can be provided with the target performance characteristics), it may be assumed that the one or more end devices, on the one hand, and the one or more network entities as well as the support system, on the other hand, have arrived at an agreement that the service is to be provided with the target performance characteristics.

The desired performance characteristics, the target performance characteristics and/or the achieved performance characteristics may include information related to at least one of radio throughput, throughput over a radio leg, jitter, latency and a DRX configuration related parameter.

The one or more end devices may comprise at least one of one or more user equipments (UEs) and one or more machine-type communication (MTC) devices.

According to a fourth aspect, a computer program is provided. The computer program comprises program code portions for causing the steps of any one of the method aspects described herein to be performed, when the computer program is run on a computer system or on one or more computing devices. The computer program may be stored on a computer-readable recording medium or may be downloadable as a signal.

According to a fifth aspect, a support system for a wireless communication network associated with an operator is provided. The support system comprises a receiving component and an instructing component. The receiving component is configured to receive a service request. The service request requests a service to be provided with desired performance characteristics to the one or more end devices. The instructing component is configured to instruct one or more network entities of the wireless communication network to provide the service with target performance characteristics to the one or more end devices. The target performance characteristics are dependent on the desired performance characteristics and performance characteristics measurements associated with the one or more network entities.

The support system may further comprise a reporting component. The reporting component may be configured to perform any one of the reporting procedures as described herein with respect to the method according to the first aspect.

The support system may be configured to perform any of the method steps according to the first aspect described herein.

According to a sixth aspect, an network entity for a wireless communication network associated with an operator is provided. The network entity comprises a receiving component and a providing component. The receiving component is configured to receive an instruction to provide a service with target performance characteristics to the one or more end devices. The service is requested by the one or more end devices to be provided with desired performance characteristics to the one or more end devices. The target performance characteristics are dependent on the desired performance characteristics and performance characteristics measurements associated with one or more network entities of the wireless communication network. The providing component is configured to provide the service with the target performance characteristics to the one or more end devices.

The one or more network entities of the wireless communication network may comprise the network entity according to the sixth aspect.

The network entity may be configured to perform any of the method steps according to the second aspect described herein.

The network entity as described herein may comprise or be configured as or be part of an access network node.

The network entity may comprise, be part of, or be configured as a radio base station. The radio base station may be a NodeB/Radio Network Controller (RNC) in terms of UMTS, an eNodeB in terms of LTE, an access point in terms of WiFi or any future base station according to any future technology such as 5G.

Further, according to a fourth illustrative aspect, a network entity for providing a service from a wireless communication network associated with an operator to one or more end devices is provided. The network entity comprises a receiving component and an initiating component. The receiving component is configured to receive an instruction to provide a service with target performance characteristics to the one or more end devices. The service is requested by the one or more end devices to be provided with desired performance characteristics to the one or more end devices. The target performance characteristics is dependent on the desired performance characteristics and performance characteristics measurements associated with the one or more network entities. The initiating component is configured to provide, the service with the target performance characteristics to the one or more end devices.

Further, according to a fifth illustrative aspect, a network entity for providing a service from a wireless communication network associated with an operator to one or more end devices is provided. The network entity comprises a providing component. The providing component is configured to provide the service with the target performance characteristics to the one or more end devices based on an instruction to provide a service with target performance characteristics to the one or more end devices. The service is requested by the one or more end devices to be provided with desired performance characteristics to the one or more end devices. The target performance characteristics are dependent on the desired performance characteristics and performance characteristics measurements associated with the one or more network entities.

Further, according to a sixth illustrative aspect, a network entity for providing a service from a wireless communication network associated with an operator to one or more end devices is provided. The network entity comprises an initiating component. The initiating component is configured to initiate to provide the service with the target performance characteristics to the one or more end devices based on an instruction to provide a service with target performance characteristics to the one or more end devices, the service being requested by the one or more end devices to be provided with desired performance characteristics to the one or more end devices and the target performance characteristics being dependent on the desired performance characteristics and performance characteristics measurements associated with the one or more network entities.

The network entity may be part of an access network node.

The network entity may be part of a radio base station, a NodeB, a Radio Network Controller, RNC, or an eNodeB.

The network entity according to the fourth illustrative aspect and the network entity according to the sixth illustrative aspect can be part of one network node, e.g. one physical network node or one logical network node. Such network node may be adapted to perform any of the method steps according to the first illustrative aspect and any of the method steps according to third illustrative aspect.

The network entity according to the sixth illustrative aspect and the network entity according to the fifth illustrative aspect can be part of one network node, e.g. one physical node or one logical network node. Such network node may be adapted to perform any of the method steps according to the third illustrative aspect and any of the method steps according to second illustrative aspect.

The network entity according to the fifth illustrative aspect and a further network entity configured to provide the radio communication towards the one or more devices and optionally the wireless communication network such as a Cloud RAN radio node can be part of one network node, e.g. one physical network node or one logical network node. Such node may be adapted to perform any of the method steps according to the second illustrative aspect and provide communication via the wireless interface between the network node and the one or more terminals and optionally provide communication towards the wireless communication network.

According to a seventh aspect, a wireless communication network is provided. The wireless communication network is associated with an operator. The wireless communication network comprises the support system of the fifth aspect as described herein and one or more network entities according to the sixth aspect as described herein.

The wireless communication network may be configured to perform the steps of any one of the method aspects as described herein. The wireless communication network as described herein may be operated by the operator.

The wireless communication network may be a communication network conforming to any one of the following communication standards UMTS, WCDMA, LTE, LTE-A, 5G, WiFi or to any similar future communication standards.

In general, the steps of any one of the method aspects described herein may equally be performed in one or more suitable components, devices or units, e.g. in suitable components of the support system, the network entity and/or the wireless communication network.

BRIEF DESCRIPTION OF THE DRAWINGS

In the following, the present disclosure will be further described with reference to exemplary embodiments illustrated in the Figures, in which:

FIGS. 8a and 8b is a flowchart illustrating a method embodiment that can be performed using the support system of FIG. 1 or FIG. 7;

DETAILED DESCRIPTION

In the following description, for purposes of explanation and not limitation, specific details are set forth, such as specific network topologies including particular network nodes, in order to provide a thorough understanding of the present disclosure. It will be apparent to one skilled in the art that the present disclosure may be practiced in other embodiments that depart from these specific details. For example, although the present disclosure is sometimes described with reference to Long Term Evolution (LTE) as a specific example for a wireless communication technique, the present disclosure may be practiced in any network to which mobile or stationary users using a corresponding user equipment (UE) may attach. For example, the present disclosure is applicable to other cellular networks such as Global System for Mobile Communications (GSM) networks, Universal Mobile Telecommunications System (UMTS) networks, LTE-Advanced (LTE-A) networks, 5G networks or to Wireless Local Area Network (WLAN) or similar wireless networks such as WiFi networks.

Those skilled in the art will further appreciate that functions explained herein below may be implemented using individual hardware circuitry, using software functioning in conjunction with a programmed microprocessor or a general purpose computer (GPC), using an Application Specific Integrated Circuit (ASIC) and/or using one or more Digital Signal Processors (DSPs). Functions explained herein below may also be implemented using a virtualized execution environment on a general purpose or specialized processing cloud (which at its lowest hardware layer may be a GPC, ASIC, DSP etc). When the method is implemented using a computer program, the computer program might, through the cloud logic, be dynamically distributed over several processing instances, wherein these several processing instances might be of different types. It will also be appreciated that when the present disclosure is described as a method, it may also be embodied in a computer processor and a memory coupled to a processor, wherein the memory is encoded with one or more programs to cause the processor to perform the methods disclosed herein when executed by the processor. Although it is in the following referred to the more specific term "access network node" the details and principles described below equally apply to a "network entity" in general.

Figure 1:
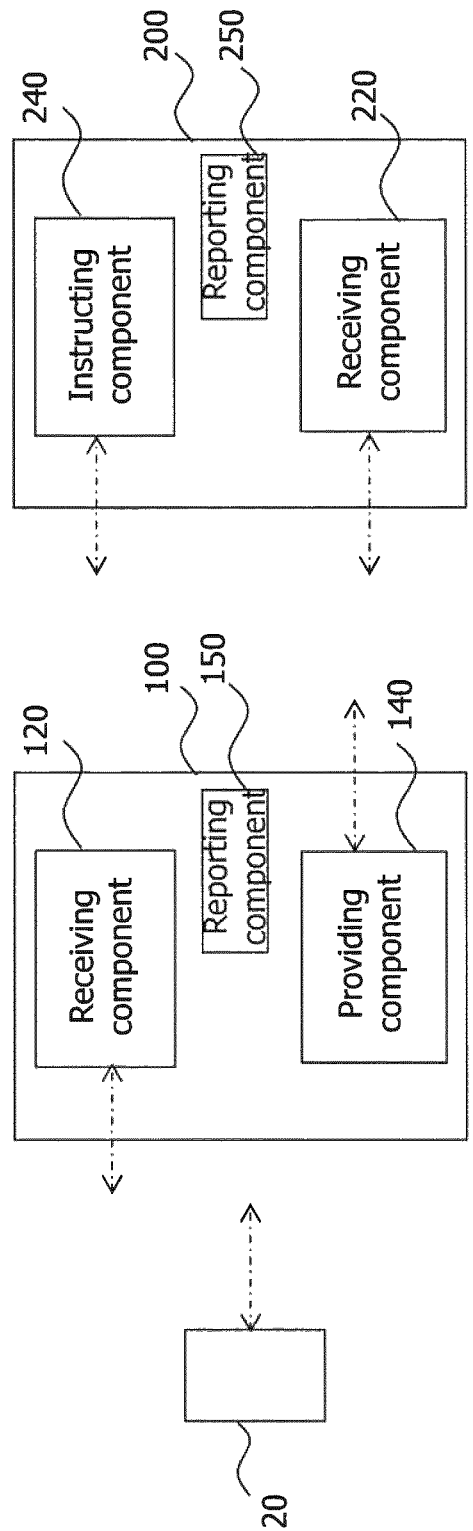
FIG. 1 is a schematic illustration of a wireless communication network comprising an embodiment of an access network node and an embodiment of a support system.

FIG. 1 shows a wireless communication network 10 that is associated with, e.g. operated by, an operator. An embodiment of an access network node 100 and an embodiment of a support system 200 are arranged in the wireless communication network 10. Although only one access network node 100 is shown in FIG. 1, any number of access network nodes that are configured as access network node 100 can be arranged in with wireless communication network 10. Further, a user equipment (UE) 20 is shown as an example of an end device that is arranged in the wireless communication network 10. Although not shown in FIG. 1, a service back end that the UE 20 communicates with may be present. Although only one UE 20 is shown in FIG. 1 for sake of simplicity, any number of UEs 20 can be arranged in the wireless communication network 10. For sake of explanation rather than limitation, FIG. 1 will be explained further with respect to UE 20 as an example of one or more end devices that can be arranged in the wireless communication network 10.

Access network node 100 comprises a receiving component 120 and a providing component 140. The receiving component 120 is configured to receive an instruction to provide a service with target performance characteristics to UE 20. The service is requested by UE 20 to be provided with desired performance characteristics to UE 20. The target performance characteristics are dependent on the desired performance characteristics and performance characteristics measurements associated with access network node 100 and/or other access network nodes. The providing component 140 is configured to provide the service with the target performance characteristics to UE 20.

Access network node 100 may further comprise an optional reporting component 150. Any one of the reporting functions of the access network node 100 described herein may be implemented using the reporting component 150.

Access network node 100 will be further described below with respect to FIG. 3.

The support system 200 comprises a receiving component 220 and an instructing component 240. The receiving component 220 is configured to receive a service request. The service request requests a service to be provided with desired performance characteristics to UE 20. The instructing component 240 is configured to instruct access network node 100 to provide the service with target performance characteristics to UE 20. The target performance characteristics are dependent on the desired performance characteristics and performance characteristics measurements associated with access network node 100 and/or other access network nodes.

Support system 200 may further comprise an optional reporting component 250. Any one of the reporting functions of the support system 200 described herein may be implemented using the reporting component 250.

Figure 2:
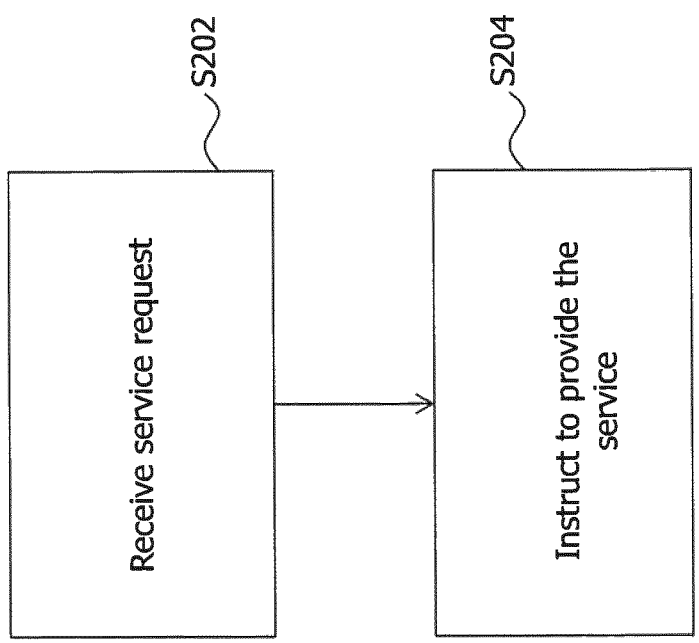
FIG. 2 is a flowchart illustrating a method embodiment performed in the support system of FIG. 1.

FIG. 2 shows a method embodiment which can be implemented in the support system 200 according to the embodiment of FIG. 1. The method embodiment supports provisioning of a service from a wireless communication network 10 associated with an operator to UE 20. In step S202, support system 200 of the wireless communication network 10 receives a service request. For example, the service request may be received by the receiving component 220 of the support system 200. The service request requests a service to be provided with desired performance characteristics to UE 20. In step S204, support system 200 instructs access network node 100 of the wireless communication network 10 to provide the service with target performance characteristics to UE 20. The target performance characteristics are dependent on the desired performance characteristics and performance characteristics measurements associated with access network node 100 and/or other access network nodes.

Figure 3:
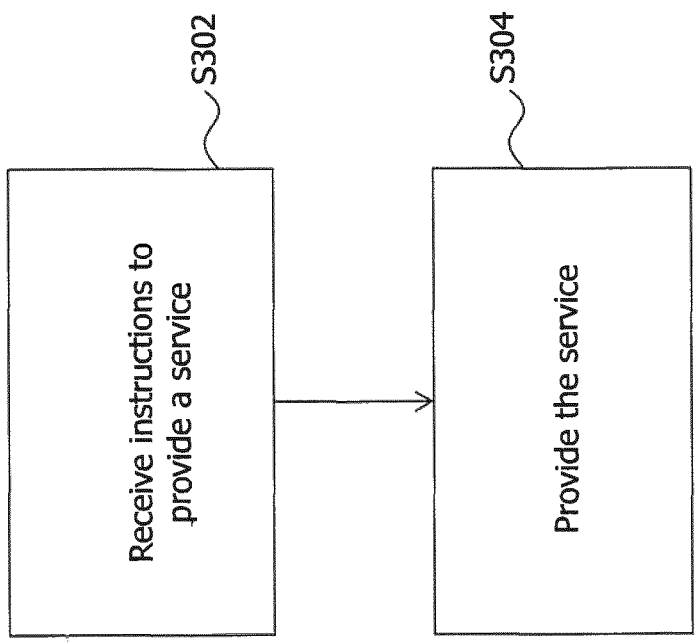
FIG. 3 is a flowchart illustrating a method embodiment performed in the access network node of FIG. 1.

FIG. 3 shows a method embodiment which can be implemented in the access network node 100 according to the embodiment of FIG. 1. The method embodiment provides a service from a wireless communication network 10 associated with an operator to UE 20. In step S302, access network node 100 receives an instruction to provide a service with target performance characteristics to UE 20. The service is requested by UE 20 to be provided with desired performance characteristics to UE 20. The target performance characteristics are dependent on the desired performance characteristics and performance characteristics measurements associated with access network node 100 and/or other access network nodes. In step S304, access network node 100 provides the service with the target performance characteristics to UE 20.

The service may be initiated (e.g. requested) by UE 20 or by the associated service back end of UE 20 during a production/operation phase described in more detail below. In a measurement phase, which is described also in more detail below, the service may, for example, be initiated by UE 20.

Figure 4:
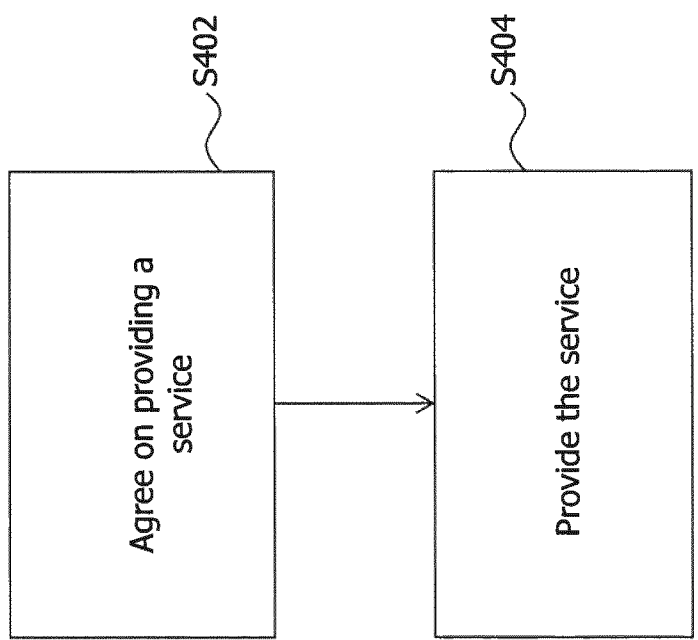
FIG. 4 is a flowchart illustrating a method embodiment performed in the wireless communication network of FIG. 1.

FIG. 4 shows a method embodiment which can be implemented in the wireless communication network 10 of FIG. 1 using access network node 100 according to the embodiment of FIG. 1 and support system 200 according to the embodiment of FIG. 1. The method embodiment provides a service between a wireless communication network 10 associated with an operator and UE 20. The method comprises agreeing, between UE 20 and support system 200 of the wireless communication network 10, on providing a service with target performance characteristics to UE 20. The service is requested by UE 20 or the associated service back end to be provided with desired performance characteristics to UE 20. The target performance characteristics are dependent on the desired performance characteristics and performance characteristics measurements associated with access network node 100. The method further comprises providing, by access network node 100, the service with the target performance characteristics to UE 20.

In the following, for sake of efficiency, the term service level agreement (SLA) will mainly be used further when referring to the performance characteristics described above. That is, the target (targeted) performance characteristics will be referred to as target SLA and/or may be understood as an SLA on which an enterprise and an operator of a network have agreed.

Figure 5:
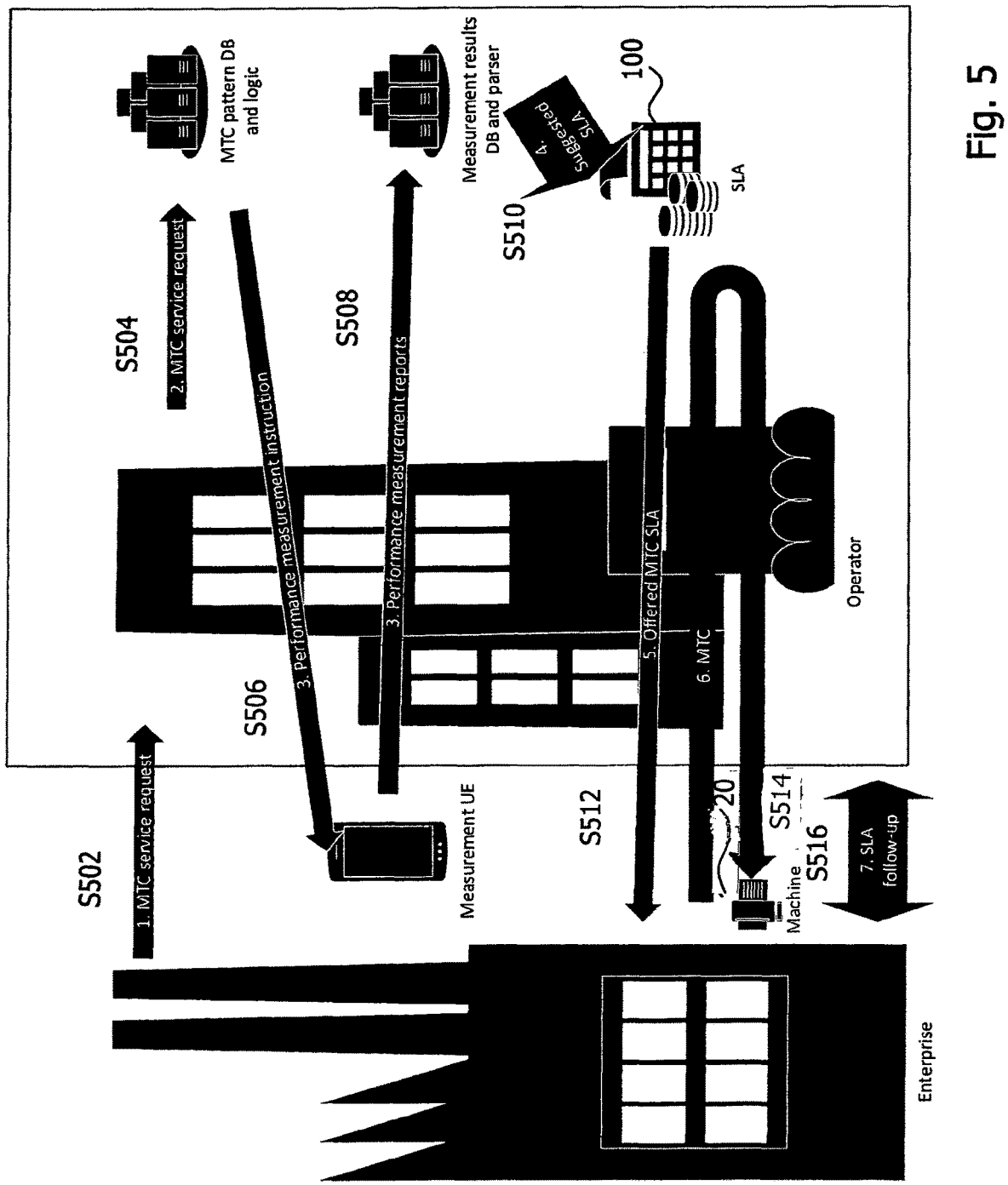
FIG. 5 gives an overview of the operation that can be performed in the wireless communication network of FIG. 1.

FIG. 5 gives an overview of an operation that can be performed in the wireless communication network of FIG. 1. In FIG. 5, a smartphone Business-to-Consumer (B2C) dominated cellular network operation is adapted to M2M communication and IoT. This is done by making it technically feasible to automatically handle and fulfil SLAs to many enterprises in parallel. For example, an enterprise sends a MTC service request towards information and communication technology (ICT) operator in step S502, who will store such a request into MTC pattern database within its own premises in step S504. The MTC service request may be considered a specific example of the service request described above. The request will be processed and via instructed program will be send to selected UEs in (a) certain region(s) in step S506 that will execute these measurement programs. Purpose of these measurement programs will be to execute tests and determine what SLAs can be achieved. In other words, the measurement programs are considered for determining a target SLA.

Results of such a measurement will be reported to the operator and stored into measurement database (within operator's premises) in step S508. Results from such a database will be parsed and in the form of a suggested SLA (target SLA) will be stored in SLA offering database in step S510. In step S512, the suggested SLA (target SLA) will be offered to the enterprise. If the enterprise accepts the suggested SLA (target SLA), MTC can be performed in step S514 with the suggested and agreed SLA. The SLA will be checked during operation and, if it needs adaptation, will be adapted accordingly in step S516.

Figure 6:
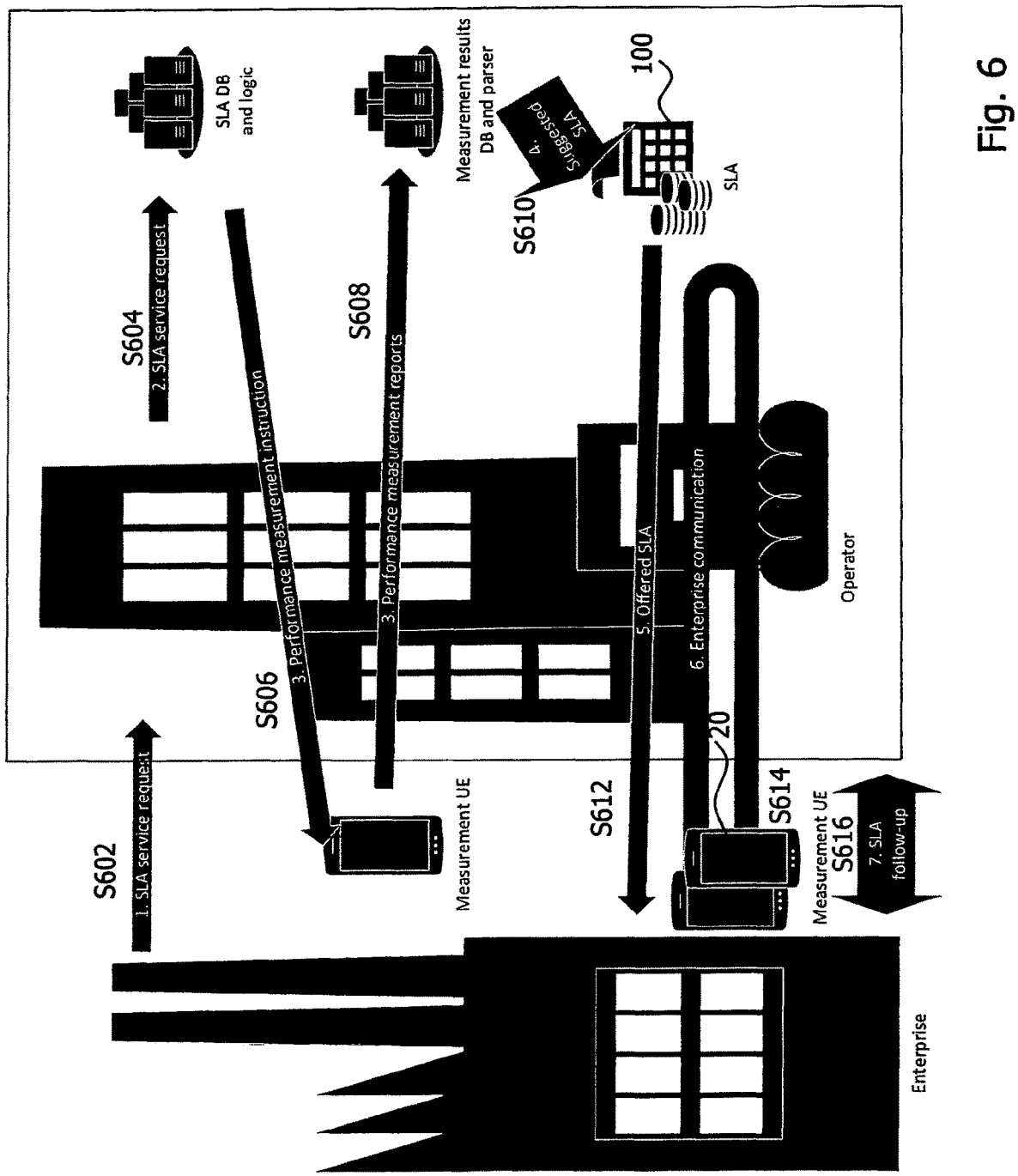
FIG. 6 gives an overview of the operation that can be performed in the wireless communication network of FIG. 1.

FIG. 6 mainly corresponds to FIG. 5. Thus, all steps explained above with respect to FIG. 5 equally apply to FIG. 6 as well. In contrast to FIG. 5, FIG. 6 relates to operation with normal UEs rather than MTC UEs. For example, an enterprise wants to have a certain access time and/or service level to open an application or to send an email with 1 MB attachment or the like. In a first phase, an operator will receive an SLA service request and will measure performance on a limited set of UEs. This will help to identify any gaps. In a second phase, changes in the network(s) will be made (e.g. adding more outdoor cells or adding new radio base stations) and then, again, a new set of the measurements will be performed, to check if things are improved and the requested/required SLA can be fulfilled. Assessing the gaps is easier in case of bigger enterprises (e.g. additional coverage can be offered with additional indoor cells). In case of smaller enterprises, some other workarounds might be suggested by the operator (e.g. to go in certain places via Digital Subscriber Line (DSL) or WiFi, in case smaller enterprise will not be able to afford indoor cell).

Further details regarding access network node 100, support system 200, and the method embodiments performed in access network node 100 and support system 200 are described below with respect to FIGS. 7 to 11. In the following, for sake of explanation rather than limitation, access network nodes will assumed to be configured as base stations in general and, more specifically, will be referred to as eNBs to illustrate, by way of example, that the technique proposed herein can be used and implemented in LTE. The technique described herein is, however, not limited to an LTE network, but can be deployed in any radio access network, including upcoming 5G networks.

Figure 7:
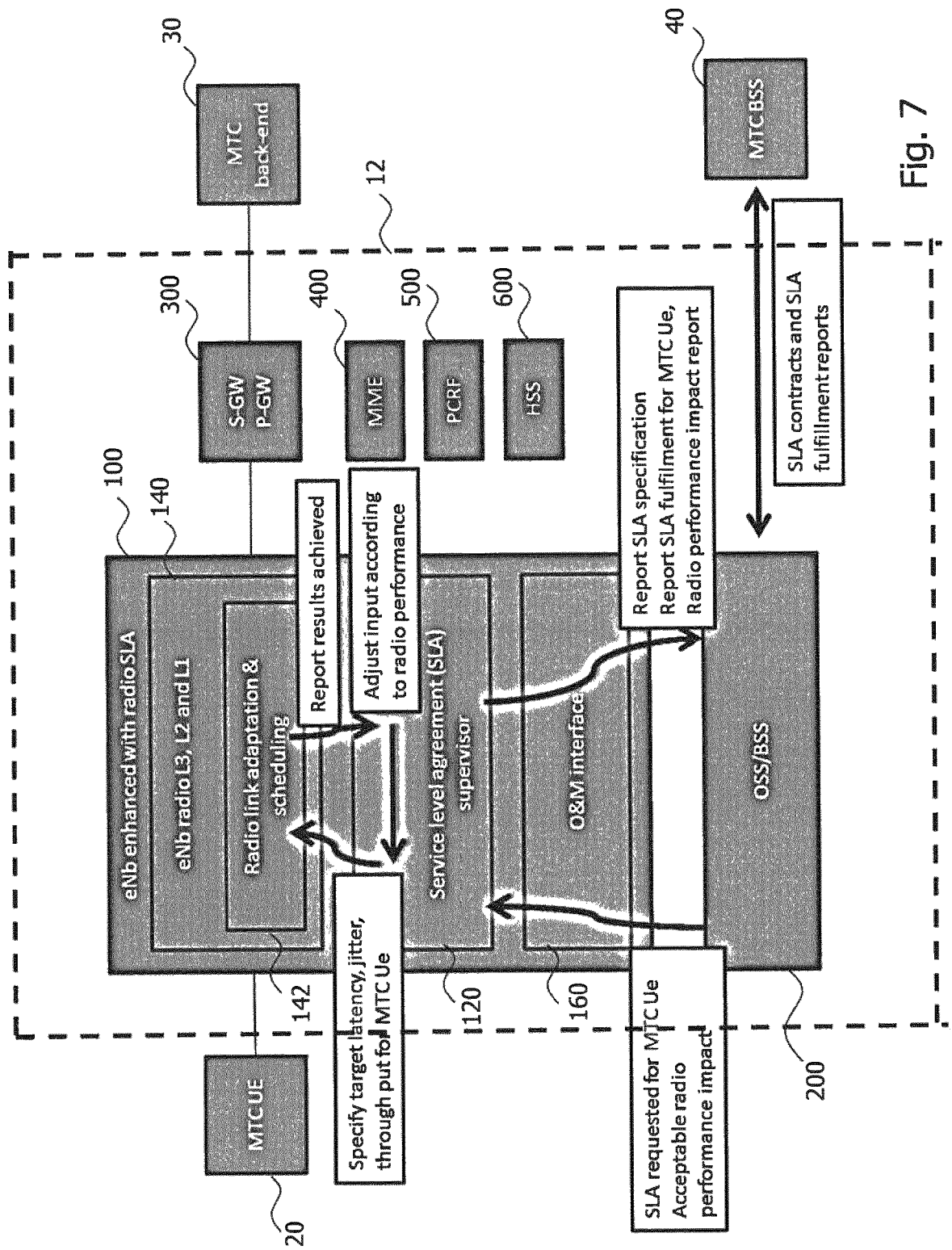
FIG. 7 is a schematic illustration of a wireless communication network comprising an embodiment of an access network node and an embodiment of a support system.

The example shown in FIG. 7 and following flow charts illustrate an LTE type network with eNBs as radio base stations (RBSs). Some of the following Figures including FIG. 7 illustrate the present disclosure by means of MTC as the service offered to enterprises, while other Figures refer to services offered to ordinary UEs, to illustrate that the present disclosure is applicable to service provisioning in general including MTC and ordinary communication techniques. That is, the technical solution described is not limited to MTC, and enables various operator SLA offerings to enterprises. To give just a further example, the present disclosure is applicable to an enterprise contracting a service level from the operator for email and/or application transactions to the enterprise employees' smartphones as illustrated, by way of example, in FIG. 6.

In the example shown in FIG. 7, a mobile operator operates the eNB 100 given as an example for the access network node described above and the operations support system (OSS)/business support system (BSS) 200 given as an example of a support system described above. Further, the operator operates core network nodes Serving-Gateway (S-GW)/Packet Data Network (PDN)-Gateway (P-GW) 300, Mobility Management Entity (MME) 400, Policy and Charging Rules Function (PCRF) 500 and Home Subscriber Server (HSS) 600. In order to visualize which elements are part of the operator network, these elements are commonly referred to as elements of the operator network 12.

As mentioned above, OSS/BSS 200 offers MTC services towards enterprises. For sake of simplicity one MTC UE 20 is shown to illustrate a plurality of MTC UEs 20 of an enterprise. For example, the enterprise orders an MTC agreement from the mobile operator by specifying what MTC UEs 20 to include and the traffic pattern the mobile network needs to support. The traffic pattern may be regarded as a specific example of the above-mentioned desired performance characteristics. The traffic pattern may also be considered a desired service level agreement (SLA) the enterprise requests from the operator. In the following, for sake of efficiency, the term SLA will be used further to illustrate the present disclosure.

For a test phase (and a later production phase), the mobile operator's OSS/BSS 200 requests the eNBs 100 where the MTC UEs 20 are located to report, e.g. via the reporting component 150, if the targeted SLA can be achieved and what the radio network performance impact is. The mobile operator tests what SLA can be achieved towards the targeted MTC UEs 20. This may be done by radio link adaptation & scheduling component 142 of eNB 100. If the mobile operator determines which target SLA can be achieved it prices and offers this SLA towards the enterprise. The offered SLA may be regarded as a specific example of the above-mentioned target performance characteristics or target SLA. In the case the enterprise accepts the offer, the MTC production phase starts and the operator's OSS/BSS 200 provides regular bills and fulfillment reports. The fulfillment reports state how well the operator has met the contracted SLA. The regular bills and fulfillment may be reported by the reporting component 250 to the enterprise, for example.

The eNB 100 is enhanced with a function that is called SLA supervisor 120 herein. The SLA supervisor 120 may perform one or more of the following tasks. The SLA supervisor 120 may instruct the existing radio layer 3 (L3) function to report the achieved radio throughput, jitter and latency for each of the MTC UEs 20 served by eNB 100. This may be done in the test phase as well as in the production phase. The SLA supervisor 120 may execute in parallel to the legacy bearer QoS control, and enhances it on a per UE and eNB level.

The radio throughput, jitter and latency may relate to the part of the UE 20 to/from back-end communication that takes place over the radio leg rather than the radio internal throughput, jitter and latency. The radio internal throughput, jitter and latency on radio layers 1 and 2 can be very different from the L3 throughput on IP level.

The SLA supervisor 120 may compare the achieved SLA (achieved performance characteristics) with the targeted SLA (targeted performance characteristics/target performance characteristics). Upon deviations, SLA supervisor 120 may instruct the existing link adaptation and scheduling processes in the radio link adaptation & scheduling component 142 to prioritize or de-prioritize the scheduling of MTC UEs 20 over other UEs, and/or to reduce/increase block error rates as well as power levels. Prioritizing may involve different measures. For example, prioritization, may involve classical prioritization over other devices by scheduling the MTC UE 20 more frequently. Prioritization may likewise include pro-actively moving the MTC UE 20 from a higher frequency (which has higher capacity, but worse signal to noise ratio) to a lower frequency (which has a more robust communication channel) to secure the SLA. As an alternative option, although by normal radio standards there is no need but data needs urgently to be transferred to fulfill the SLA, prioritization may include pro-actively changing to a more robust/in-efficient coding (for example from 64 QAM to 16 QAM or lower) to reduce the likelihood for radio interface block errors increasing retransmissions or latency. Another option of prioritization in the uplink is to aggressively pre-schedule the MTC UE 20 (sending speculative uplink grants to the device) in order to save the SLA. Yet another option for prioritization may include allowing more power to/from the MTC UE 20 to increase signal to noise ratios.

When instructing the radio link adaptation & scheduling component 142, the SLA supervisor 120 may monitor the ratio of radio resources assigned to MTC UEs 20 does not exceed the targeted utilization (target SLA) as specified by the OSS/BSS 200, in order not to waste resources. The SLA supervisor 120 may maintain a record during what time periods the SLA for each MTC UE 20 has been fulfilled. The SLA supervisor 120 may periodically initiate reports that are sent back via the eNB's 100 O&M interface 160 to the OSS/BSS 200 indicating how well the SLA has been fulfilled for each MTC UE 20 and the MTC UE 20 vs. other UE utilization of the eNB 100.

Further details of the operation of the network shown in FIG. 7 are explained with respect to FIGS. 8a to 10. These details may be equally applied to embodiments of FIGS. 1 to 6.

An enterprise wanting to sign a machine type of communication agreement with the operator, issues a request specifying the desired SLA in step S802. The request may contain one or more of the amount of UE 20 users and their identities, the geographical area for which the MTC service shall apply and the IP addresses of the MTC back-end system. Small/medium enterprises may for example issue this request by selecting pre-configured packages on the operator's web page. Large enterprises may use their own business support systems, such as MTC BSS 40 shown in FIG. 7, to contact the operator's support system(s) 200 (e.g., OSS/BSS 200) with the request.

Upon receiving the request specifying the desired SLA, the operator's support system(s) 200 locate(s) the eNBs 100 in the targeted area in step S804. The operator's support system(s) 200 assess(es) the radio utilization in the targeted eNbs 100 (step S806). Based on this, the service price and tentative service level that can be offered is determined as a target SLA. In step S808, the operator provides the enterprise with a tentative offer by forwarding the target SLA. If accepted by the enterprise, the enterprise indicates that it wants to proceed testing the target SLA compliance, e.g. by testing whether the achieved performance corresponds sufficiently to the target SLA (step S810).

In step S812, the operator's support system(s) 200 define(s) and allocate(s) one or more QCI values (called mQCI) to be used for the SLA. In the case the operator's network 12 supports a large number of non-standard mQCI values, separate mQCI values per enterprise can be used and identify an enterprise's service level. In case only 3rd Generation Partnership Project (3GPP) compliant QCI values are supported, the operator will reserve at least one QCI value as mQCI for enterprise traffic. Several enterprises will in this scenario share a QCI value and an enterprise's service level will be identified by the MTC back-end IP addresses. Although not shown in the flow chart, in a practical network implementation, the enterprise may further request the operator by standard firewall and routing techniques to only accept the MTC traffic on certain Internet routes, protocol and ports. This may be done to reduce the risk of service degradation through unwanted traffic directed to/from the MTC back-end IP addresses by $3^{rd}$ parties (e.g. IP address spoofing, denial of service attacks etc).

Further, the support system 200 may operate with values different to QCI values and may map, within the support system 200, these values respectively to corresponding QCI values. Such values may be easier to understand for users and could be, for example, an easy to understand SLA value, like "Daily meter readout" or the like.

In step S814, the operator's support system(s)s 200 assign(s) the QCI values to the enterprise subscriber identities through interactions with the HSS 600 and the PCRF 500. The operator's support system(s) 200 load(s) the targeted service level together in the targeted eNbs 100 (step S816). The acceptable radio performance impact for other subscribers when attempting to fulfill the enterprise service level is also loaded, as are the QCI values. The support system(s) 200 finally instruct(s) the eNB 100 if enterprise unique mQCI values and/or the MTC back-end IP address shall be used for identifying traffic subject to the SLA. Since the service level is loaded per eNB 100, the same QCI value can indicate different service levels in different eNBs 100, for example a specific service level for eNBs 100 located within an enterprise. The service levels can also vary depending on the time of day, like meter read out type of MTC could have a higher service level during night time than during day time.

In step S818, the operator indicates to the enterprise that the test phase can begin. The enterprise's UEs 20 register and start to communicate with the enterprise back end systems as will be explained below with respect to the flow charts of FIGS. 9 and 10 (step S820). In step S822, the operator periodically reports and prices the service and the service level achieved, based on input from the participating eNBs 100. When the enterprise has gained confidence in the achievable service and price level, the enterprise requests the operator to stop the test phase and start the operation (step S824). In step S826, the enterprise's UEs 20 register and start to communicate with the enterprise back end systems as detailed in the flow charts of FIGS. 9 and 10. Then, in step S828, the operator continues to periodically report and prices the service and the service level achieved based on input from the participating eNBs 100 and/or UEs 20.

Figure 9:
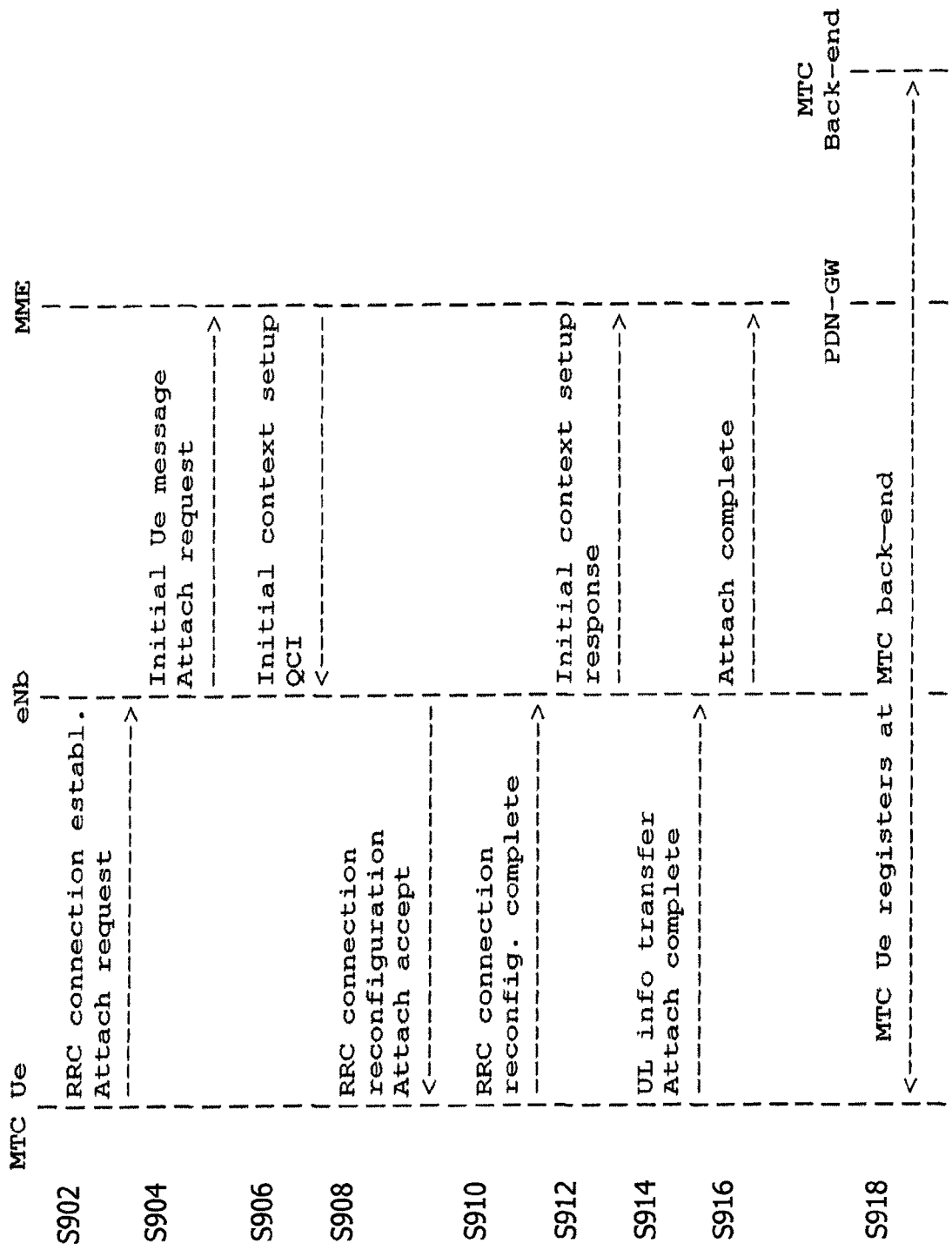
FIG. 9 is a flowchart illustrating a method embodiment that can be performed using the access network node of FIG. 1 or FIG. 7.

Referring to FIG. 9, the MTC UE 20 initiates the registration with the mobile network by requesting to be attached (steps S902 and S904). The eNB 100 forwards the request to the MME 400, which informs other parts of the operator's network 12 (not shown in the flow chart) about the UE 20 registration. The eNB 100 is at this stage unaware if the UE 20 is a MTC UE 20 type with a special SLA. In step S906, the MME 400 requests the eNB 100 to attach UE 20 to the network and forwards the QCI to be used for the connection. The eNB 100 inspects the QCI value and if it is an enterprise unique mQCI value, the eNB 100 marks that UE 20 shall be handled according to the associated service level agreements for this enterprise.

In steps S908 and S910, eNB 100 establishes the radio bearers to be needed to support the QCI and informs the UE 20 that the attach request has been accepted. The eNB 100 informs the MME 400 that the radio bearers have been established (step S912). In steps S914 and S916, eNB 100 relays the attach complete message from UE 20 to the MME 400. In step S918, MTC UE 20 registers at the MTC back-end by sending and receiving data in the up- and downlinks. In the case no enterprise unique mQCI value has been used, eNB 100 learns the service level to apply by inspecting the MTC back-end IP address.

Figure 10:
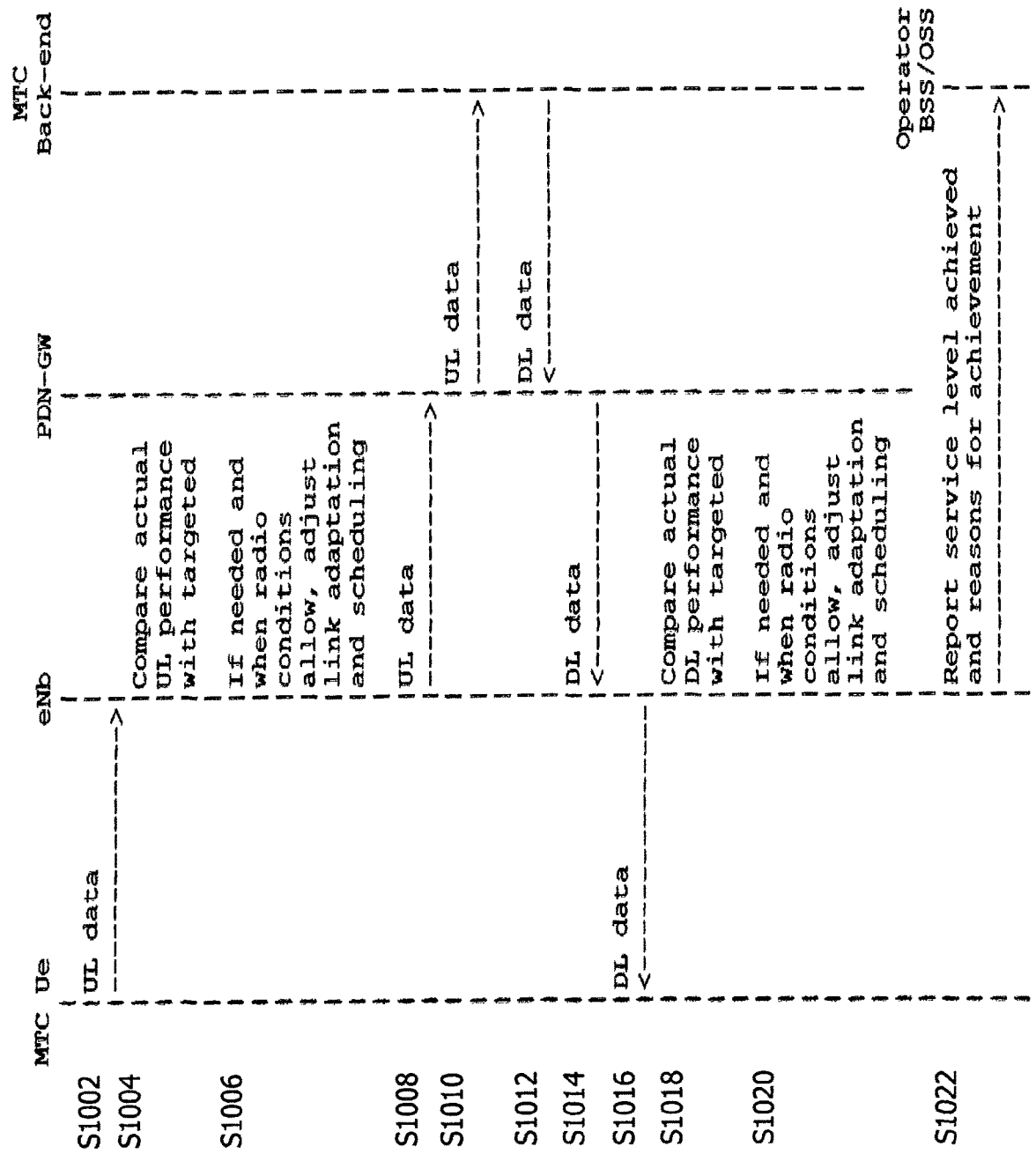
FIG. 10 is a flowchart illustrating a method embodiment that can be performed using the access network node of FIG. 1 or FIG. 7.

Referring to FIG. 10, the MTC UE 10 sends data in the uplink towards the MTC back-end via eNB 100 in step S1002. In step S1004, as long as the traffic is directed towards the MTC back-end, and MTC UE 20 uses an mQCI, eNB 100 will monitor the service level achieved. The eNB will hereby inspect the destination IP addresses of each IP packet received from MTC UE 20, and continue to monitor the service level as long as the majority of the IP packets (e.g. selectable by parameter) are directed towards the MTC back-end.

If eNB 100 detects that MTC UE 20 uplink radio performance is lower than the targeted service level, eNB 100 will prioritize scheduling and link adaptation for the UE 20 (step S1006). This will continue until the MTC UE 20 uplink performance is brought back within the targeted service level (range), or eNB 100 determines that the impact on the radio conditions (including the performance impact on the other UEs 20 the eNB 100 handles) is above the acceptable radio performance impact the operators support system(s) 200 allowed. If eNB 100 detects that MTC UE 20 uplink radio performance is higher than the targeted service level or the impact on the radio conditions is higher than allowed, eNB 100 will gradually de-prioritize scheduling and link adaptation until first the radio conditions and secondary the service level is within range. The eNB 100 notes if, and possibly, for how long, the SLA compliance is achieved.

In steps S1008 and S1010, the eNB 100/P-GW 300 relays the data from MTC UE 20 to the MTC back-end. In steps S1012 to S1020, the MTC back-end sends data via the P-GW 300/eNB 100 to MTC UE 20. The eNB 100 supervises the radio performance and through scheduling and link adaptation takes actions to meet the targeted service level and radio conditions. In step S1022, eNB 100 periodically reports the service level per enterprise as indicated per mQCI and MTC back-end IP address to the operator OSS/BSS 200. The report also contains information why a service level could not be met indicating if network coverage and/or network capacity need to be improved.

Summarizing FIGS. 7 to 10, an RBS, like eNB 100 for a LTE system, is enhanced with SLA supervisor 120. The SLA supervisor 120 communicates with the mobile operators support system(s) such as OSS/BSS 200, which handle(s) the SLA with the enterprise. This creates a scalable and automatic solution, possible to run via a web interface where an enterprise can sign up to (a) MTC service(s) without any manual support from the mobile operators. The solution allows dynamic adaptation of an individual RBS' air interface performance to meet contracted SLAs, like for MTC, based on continuous performance measurements. This enables mobile operators to discover, price and offer their network capabilities in different parts of the network towards enterprises and with well-defined SLAs. Mobile operators will be able to offer a range of MTC and other type of services to many more enterprises, increasing the mobile operator income. Mobile operators can report and charge for SLA fulfillment towards enterprises contracting MTC and other type of services.

In a first test phase, the enterprise requests a certain service with required expectations for performance characteristics from the operator. These requirements are translated by the OSS/BSS 200 into technical requirements whose fulfillment need to be tested by the access network node(s) such as eNBs 100. The access network node(s) instruct(s) some of the end devices such as UEs 20 of the enterprise to perform measurements and report the measurement results back to the operator. During this, the operator may change the current network architecture for the enterprise coverage area. The operator determines a suitable configuration of the SLA, and sends an offer to the enterprise which may accept the offer.

In an operational phase, the operator enforces the SLA by legacy bearer QoS control. To this end, the access network node(s) continuously monitor(s) the traffic for the end devices of the enterprise to verify whether the SLA is fulfilled or not. The operator's access network node(s) involved in the communication apply/applies measures such as link adaptation and prioritization to accomplish SLA fulfillment. The operator's access network nodes may also inform about or instruct the UE 20 what link adaptation and prioritization to use in the uplink. The UE logic and the access to UE signaling may be legacy to secure that the technique proposed herein works with unchanged UEs and chip sets. Among others, OSS/BSS 200 instructs the access network node(s) about the spectrum priority order and allowed usage to fulfill the SLA, and the access network node(s) report(s) back which spectrum usage was actually done to achieve the SLA.

Currently, service provision between an operator and a smartphone owner relates to the consumer market, where contracts between both parties have fixed conditions (pricing and fixed performance characteristics). By way of the technique described herein it is addressed how to set up a connection or relation between an operator and an enterprise having end devices like MTC devices and/or smartphones. By way of the techniques described herein, contracted service levels set per RBS may shape radio communication to/from individual enterprises regarding particular MTC communication traffic. The well-defined service described above enables further use cases and to be sold to a specified and potentially higher price than best effort services.

Figure 11:
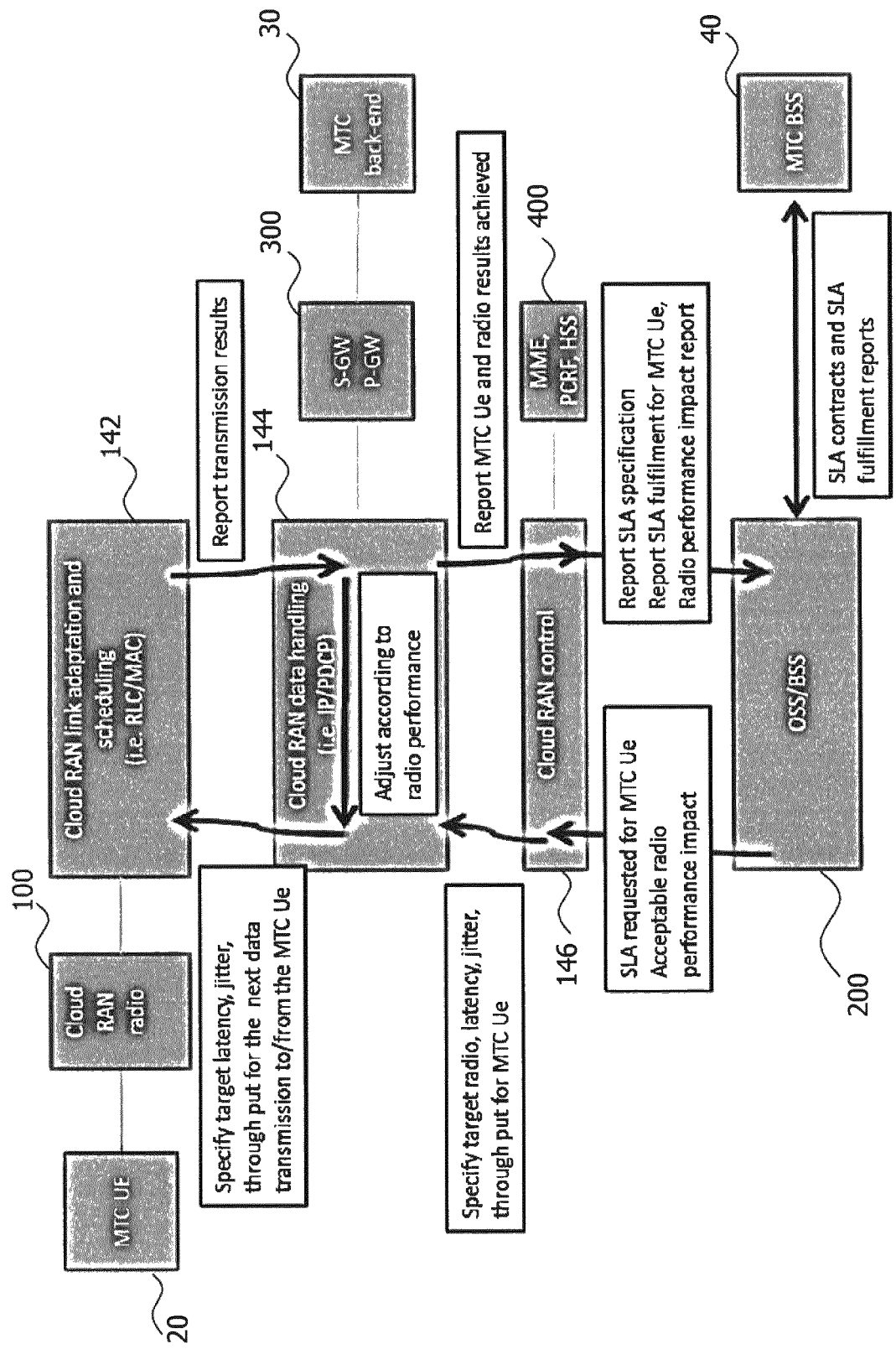
FIG. 11 is a variant of the architecture of FIG. 7.

FIG. 11 shows a variant of the architecture of FIG. 7. More specifically, FIG. 11 schematically illustrates a virtualized implementation of the architecture of FIG. 7. Cloud and virtualization technologies make it attractive to split one or more network entities such as Radio Base Stations (RBSs), like an eNb, into several discrete nodes to achieve centralized and pooled hardware, while allocating low latency and high bandwidth requirements close to the radio unit. Depending on the targeted radio network design, these nodes can be physical or logical nodes. A typical eNb split is described below.

The control layer, O&M and S1-C communication may be allocated to a Cloud Radio Access Network (RAN) control node (CRcn) 146. The user data IP and the PDCP protocol layers may be allocated to a Cloud RAN data handling node (CRdhn) 144. The CRcn and CRdhn can be one node, e.g. one physical node or one logical node. The functionality of the SLA supervisor 120 may be split between the CRcn and CRdhn nodes. The RLC and MAC layers may be allocated to a Cloud RAN link adaptation and scheduling node (CRlasn), which may implement the corresponding functionality of radio link adaptation and scheduling component 142. The radio units may be allocated to a Cloud RAN radio node (CRrn) 100. The CRdhn and the CRlasn can be one node, e.g. one physical node or one logical node. The Cloud RAN radio 100 and the CRlasn can be one node, e.g. one physical node or one logical node.

The Cloud RAN nodes 146, 144, 142, 100 may implement the service level agreement (SLA) functionality as described herein using the following new interfaces: The CRcn 146 may instruct the CRdhn 144 about the allowed radio impact, latency, jitter and throughput objectives for the MTC UE 20. For upcoming transmissions to/from the MTC UE 20, the CRdhn 144 may inform the CRlasn 142 about the target downlink and uplink latency, jitter, throughput and radio impact requirements. The CRlasn 142 may report the transmission requirements fulfillment to the CRdhn 144. The CRdhn 144 may compare these results with the objectives and makes adjustments as needed for the upcoming transmissions. The CRdhn 144 may report achieved MTC UE performance and actual radio impact to the CRcn 146. The interface between the CRlasn 142 and the CRrn 100 is unaffected by the MTC SLA function. The MTC SLA interfaces to/from the operator OSS/BSS 200 do not differ between the monolithic RBS and the Cloud RAN architecture.

Figure 8B:
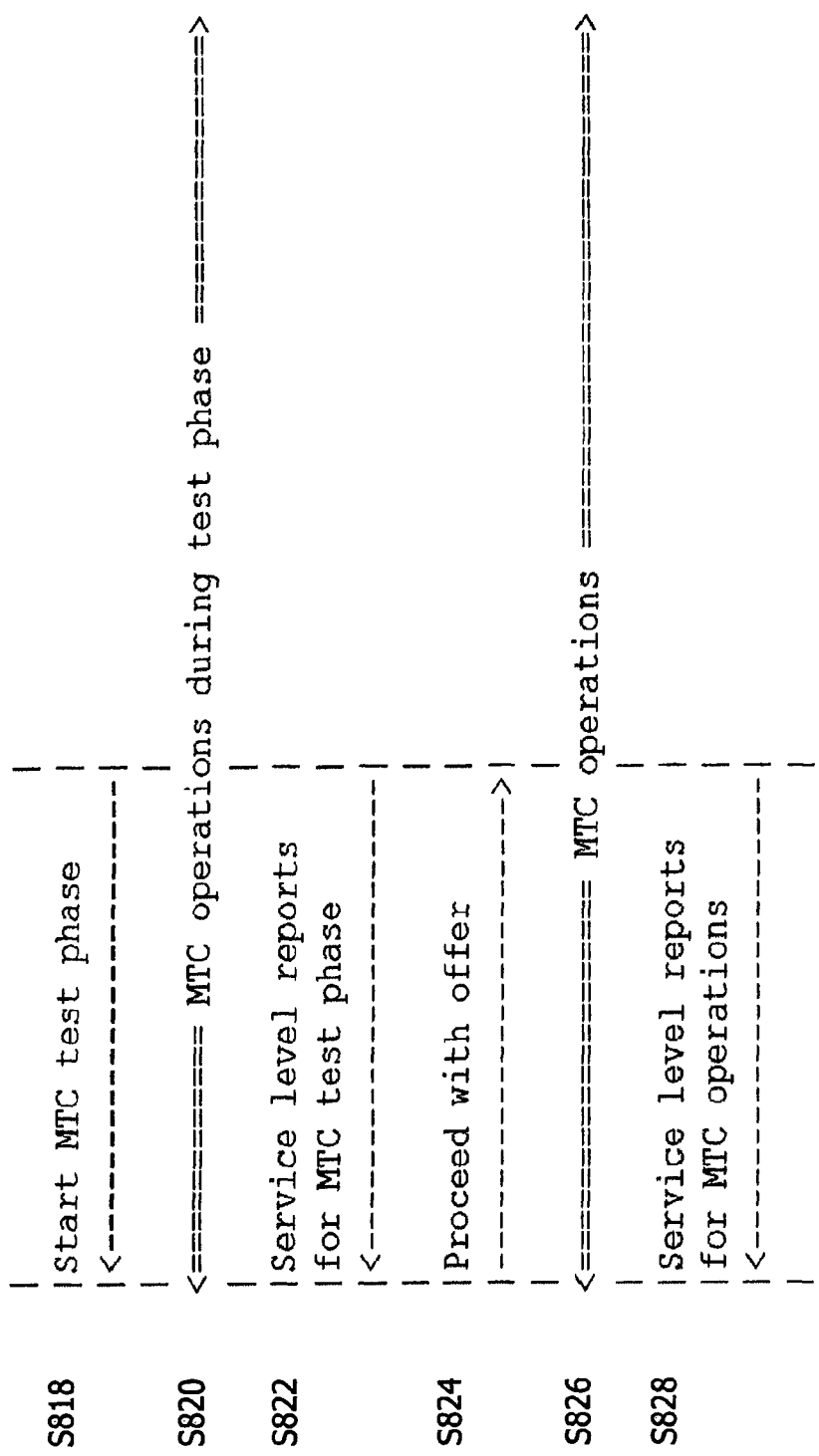
Figure 12:
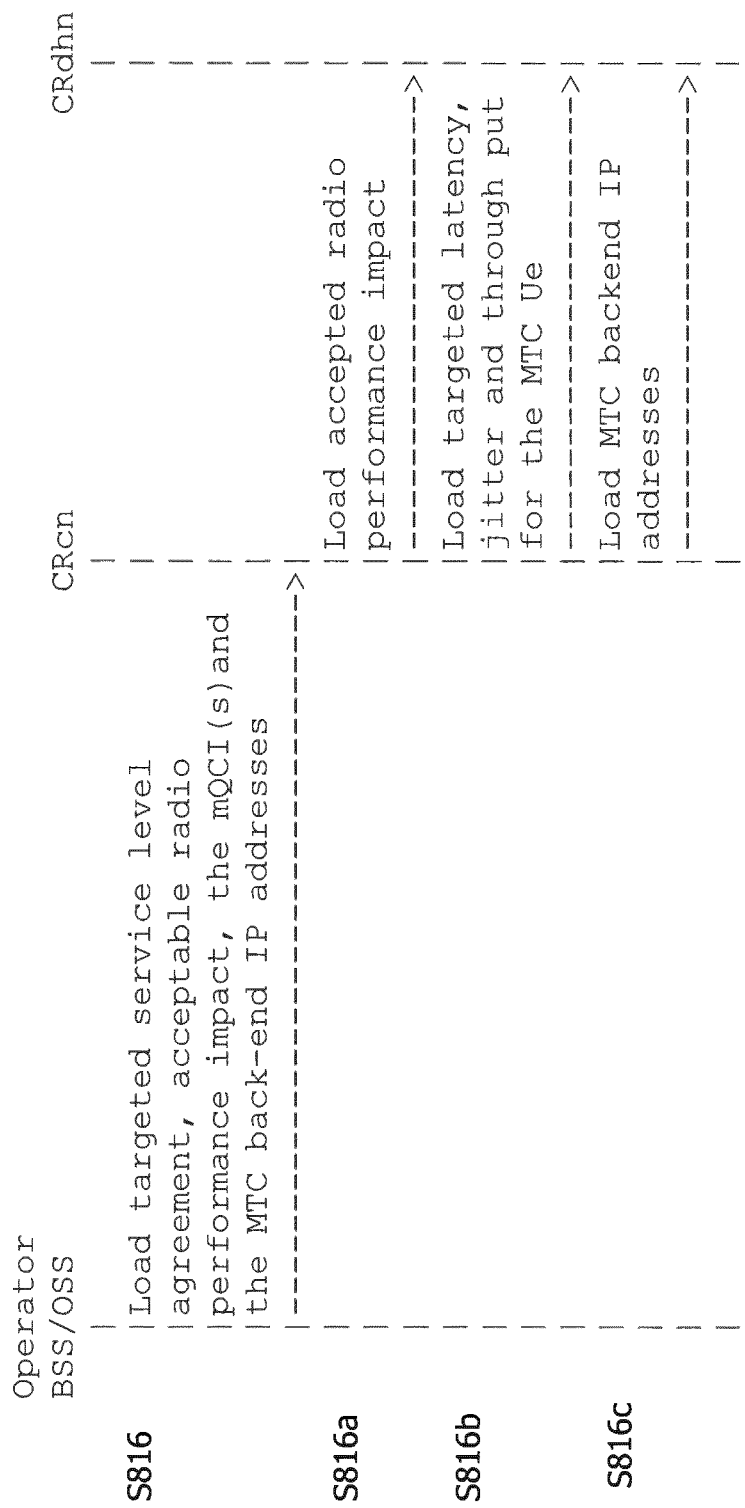
FIG. 12 is a flowchart showing a step of the flowchart of FIG. 8a when carried in the variant of FIG. 11.

With reference to FIG. 12 it is explained, by way of example, how step S816 of FIG. 8 can be implemented in the virtualized architecture of FIG. 11. Other steps of FIG. 8 may be implemented accordingly.

As described with reference to FIG. 8, in step S816, the operator's support system(s) 200 load(s) the targeted service level together in the targeted eNbs 100 (step S816). The acceptable radio performance impact for other subscribers when attempting to fulfill the enterprise service level is also loaded, as are the QCI values. The support system(s) 200 finally instruct(s) the eNb 100 if enterprise unique mQCI values and/or the MTC back-end IP address shall be used for identifying traffic subject to the SLA. As also described with respect to FIG. 8, since the service level is loaded per eNb 100, the same QCI value can indicate different service levels in different eNbs 100, for example a specific service level for eNBs 100 located within an enterprise. The service levels can also vary depending on the time of day, like meter read out type of MTC could have a higher service level during night time than during day time.

In step S816*a*, the CRcn informs the CRdhn on the acceptable radio impact to achieve the SLA, possibly adjusting previously acceptable radio impact specifications. In step S816*b*, the CRcn informs the CRdhn on the targeted latency, jitter and throughput for the MTC UE 20 in the downlink and uplink directions. In step S816*c*, in case the CRcn does not use a mQCI, the CRcn instructs the CRdhn to monitor the MTC backend IP addresses to determine when to supervise the MTC SLA.

Figure 13:
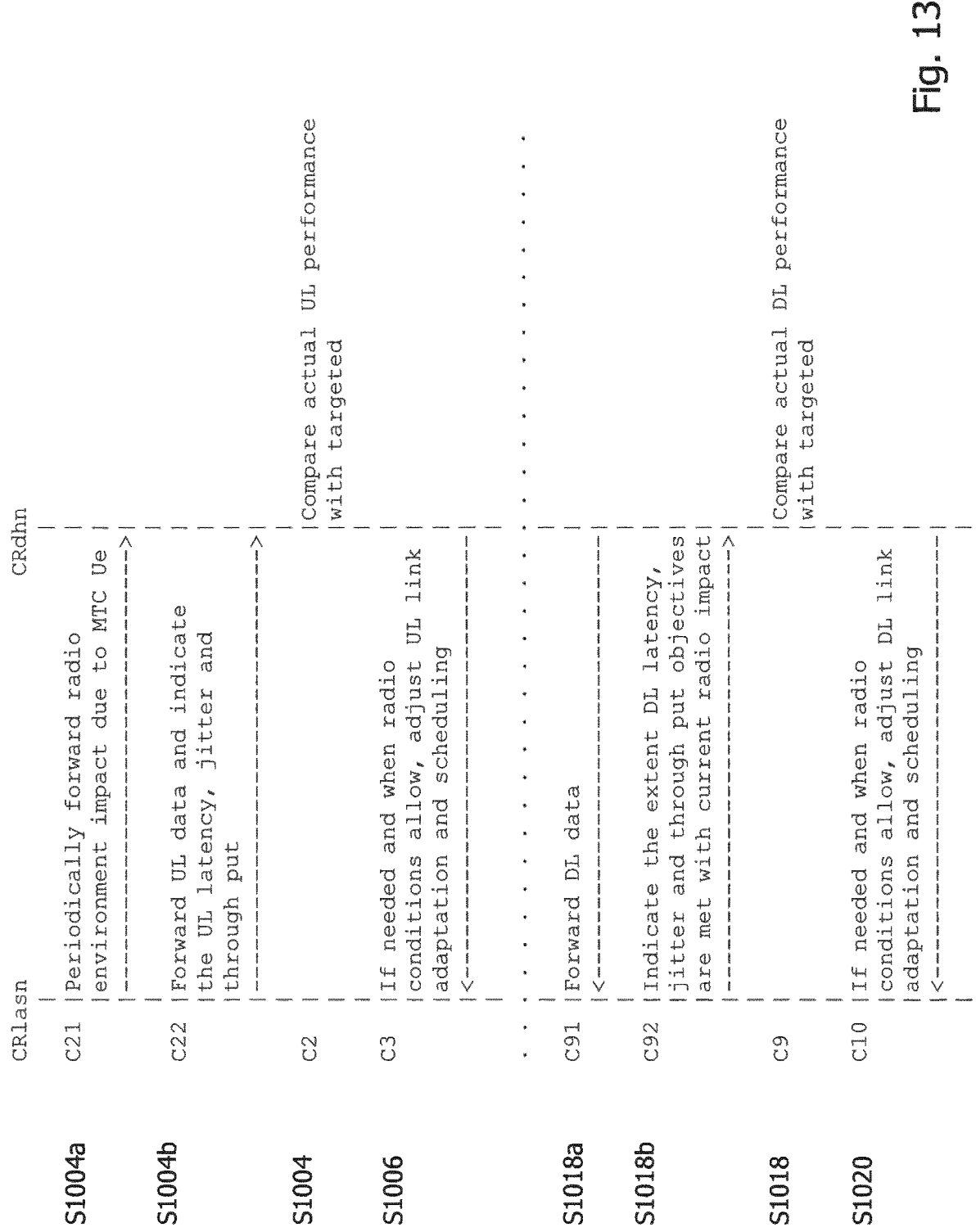
FIG. 13 is a flowchart showing steps of the flowchart of FIG. 10 when carried in the variant of FIG. 11.

With respect to FIG. 13, some details described with respect to FIG. 10 are described for the virtualized architecture of FIG. 8. In particular, the implementation of steps S1004, S1006, S1018 and S1020 is described for the virtualized architecture according to FIG. 8 with reference to FIG. 13.

In step S1004a, the CRlasn periodically informs the CRdhn how much the radio environment is impacted by the MTC SLAs. This allows the CRdhn to determine the strategy for increasing and decreasing the link adaptation and scheduling for MTC UEs 20. Then, in step S1004b, for each uplink transmission, the CRlasn strives to achieve the latency, jitter and throughput targets through scheduling and link adaptation within the limits given by CRdhn. The CRlasn informs the CRdhn how well the latency, jitter and throughput target are met. In step S1004, as long as the traffic is directed towards the MTC back-end, and the MTC UE 20 uses an mQCI, the CRdhn will monitor the latency, jitter and throughput targets are achieved on IP packet level. The CRdhn will hereby inspect the destination IP addresses of each IP packet received from the MTC UE 20, and continue to monitor the service level as long as the majority of the IP packets (selectable by parameter) are directed towards the MTC back-end.

According to step S1006, if the CRdhn detects that the MTC UE uplink radio performance is lower than the targeted service level, the CRdhn instructs the CRlasn to prioritize scheduling and link adaptation for the UE 20. This will continue until the MTC UE uplink performance is brought back within the targeted service level, or the CRlasn indicates that the impact on the radio conditions (including the performance impact on the other UEs the eNb handles) is above the acceptable radio performance impact the operators support systems allowed. If the CRdhn detects that the MTC UE uplink radio performance is higher than the targeted service level or the impact on the radio conditions is higher than allowed, the CRdhn will gradually de-prioritize scheduling and link adaptation until first the radio conditions and secondary the service level is within range. The CRdhn notes the service level agreement compliance achieved.

In steps S1018a to S1020, the CRdhn supervises the radio performance and instructs, if needed to meet the targeted service level and radio conditions for the MTC data sent in the downlink, the CRlasn to have a more aggressive or conservative scheduling and link adaptation.

Figure 14:
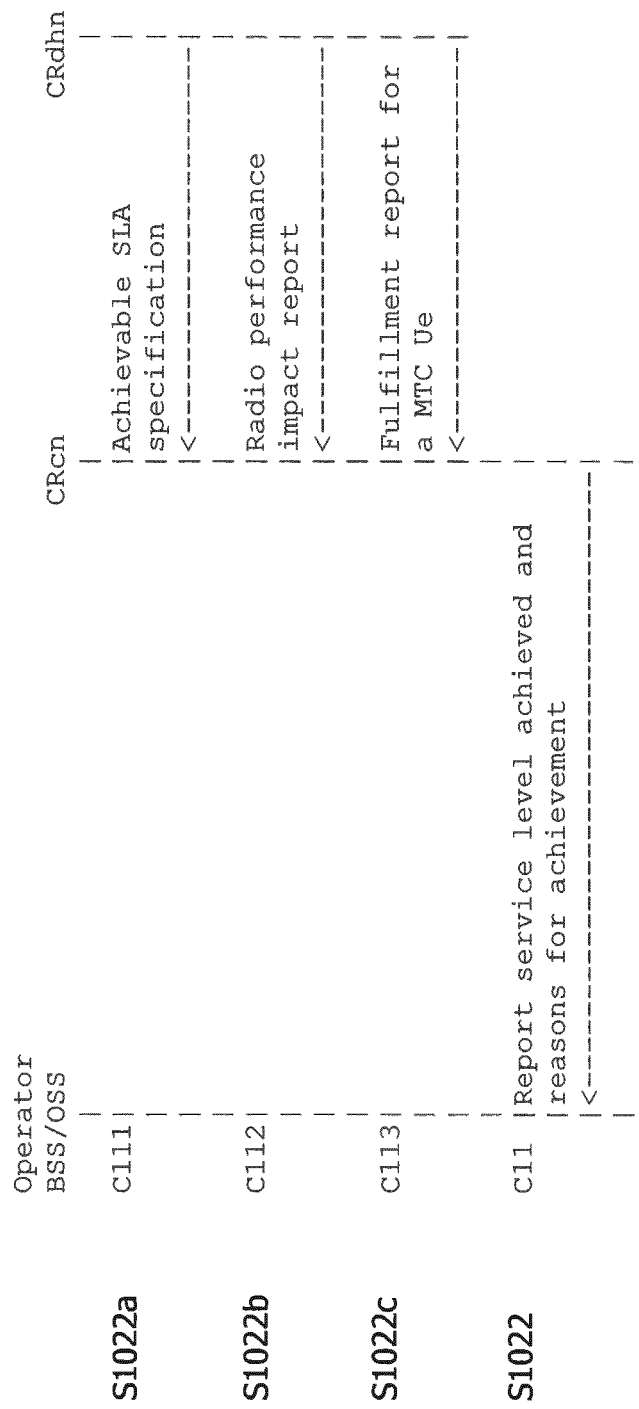
FIG. 14 is a flowchart showing steps of the flowchart of FIG. 10 when carried in the variant of FIG. 11.

With respect to FIG. 14, some details described with respect to FIG. 10 are described for the virtualized architecture of FIG. 8. In particular, the implementation of step S1022 is described for the virtualized architecture of FIG. 11 with reference to FIG. 14.

In step S1022a, the CRdhn periodically reports to the CRcn the service level agreements that can be achieved within the given radio conditions and load. Then, in step S1022b, the CRdhn periodically reports to the CRcn the impact on the radio performance due to the MTC UE SLA handling. In step S1022c, the CRdhn periodically report to the CRcn the extent the downlink and uplink latency, jitter and throughput requirements have been fulfilled. A report is sent for the each MTC UE 20.

According to step S1022, the eNb, specifically the CRcn, periodically reports the service level per enterprise as indicated per mQCI and MTC back-end IP address to the operator OSS/BSS. The report also contains information why a service level could not be met indicating if network coverage and/or network capacity need to be improved.

Figure 15:
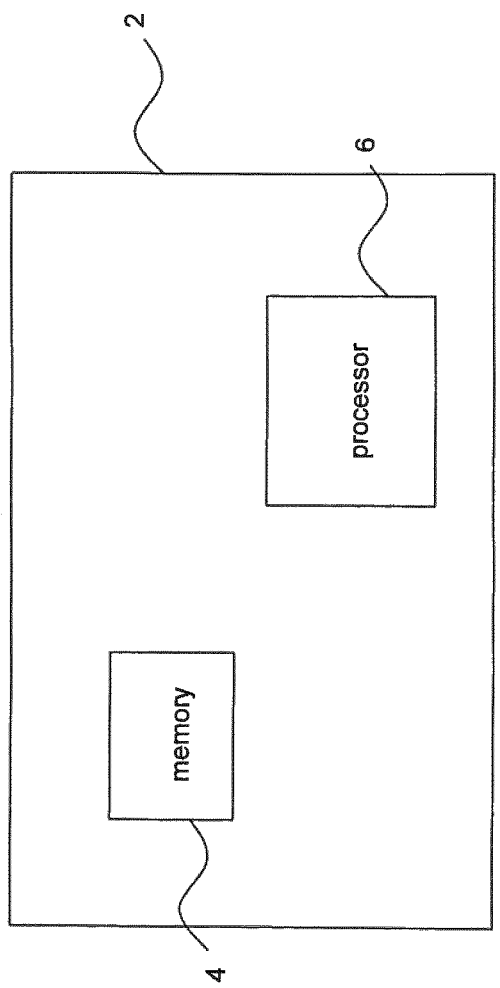
FIG. 15 is a block diagram schematically illustrating an embodiment of an access network node or a support system.

The details explained above with respect to FIGS. 1 to 14 may be summarized with respect to FIG. 15. FIG. 15 is a block diagram schematically illustrating a device embodiment of a support system 2 for supporting provisioning of a service from a wireless communication network associated with an operator to one or more end devices.

By way of example, the support system 2 is described to implement the functionalities of the support system 200 according to the embodiment of FIG. 1. The support system 2 comprises a memory 4 and a processor 6. The memory 4 contains control instructions executable by the processor 6. The processor 6 is configured to receive a service request. The service request requests a service to be provided with desired performance characteristics to the one or more end devices. The processor 6 is further configured to instruct one or more access network nodes, of the wireless communication network to provide the service with target performance characteristics to the one or more end devices. The target performance characteristics are dependent on the desired performance characteristics and performance characteristics measurements associated with the one or more access network nodes.

The device embodiment of FIG. 15 can be implemented as an access network node 2 providing a service from a wireless communication network associated with an operator to one or more end devices. By way of example, the access network node 2 is described to implement the functionalities of the access network node 100 according to the embodiment of FIG. 1. The access network node 2 comprises a memory 4 and a processor 6. The memory 4 contains control instructions executable by the processor 6. The processor 6 is configured to receive an instruction to provide a service with target performance characteristics to the one or more end devices. The service is requested by the one or more end devices to be provided with desired performance characteristics to the one or more end devices. The target performance characteristics are dependent on the desired performance characteristics and performance characteristics measurements associated with the one or more access network nodes. The processor 6 is further configured to provide the service with the target performance characteristics to the one or more end devices.

Figure 16:
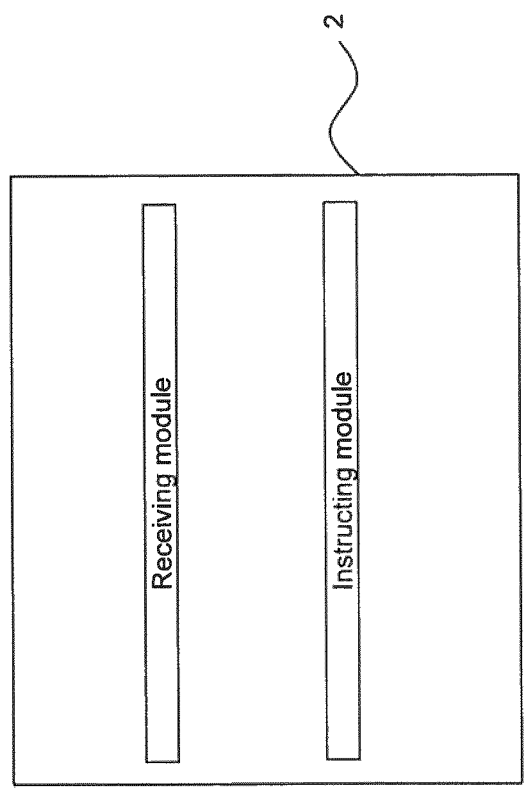
FIG. 16 is a block diagram schematically illustrating a further embodiment of a support system.

FIG. 16 shows a functional block diagram of a support system 2 configured in accordance with the principles of the disclosure as described above. The functional blocks of the support system 2 may be implemented by hardware, software, or a combination of hardware and software to carry out the principles of the disclosure. It is understood by a person skilled in the art that the functional blocks described in FIG. 16 may be combined or separated into sub-blocks to implement the principles of the disclosure as described above. Therefore, the description herein may support any possible combination or separation or further definition of the functional blocks described herein. The support system 2 of FIG. 16 is for supporting provisioning of a service from a wireless communication network associated with an operator to one or more end devices. The support system 2 comprises a receiving module for receiving a service request. The service request requests a service to be provided with desired performance characteristics to the one or more end devices. The support system 2 further comprises an instructing module for instructing one or more access network nodes of the wireless communication network to provide the service with target performance characteristics to the one or more end devices. The target performance characteristics are dependent on the desired performance characteristics and performance characteristics measurements associated with the one or more access network nodes. Although not shown in FIG. 16, the support system 2 may comprise an optional reporting module for performing reporting functions described herein with respect to the support system.

Figure 17:
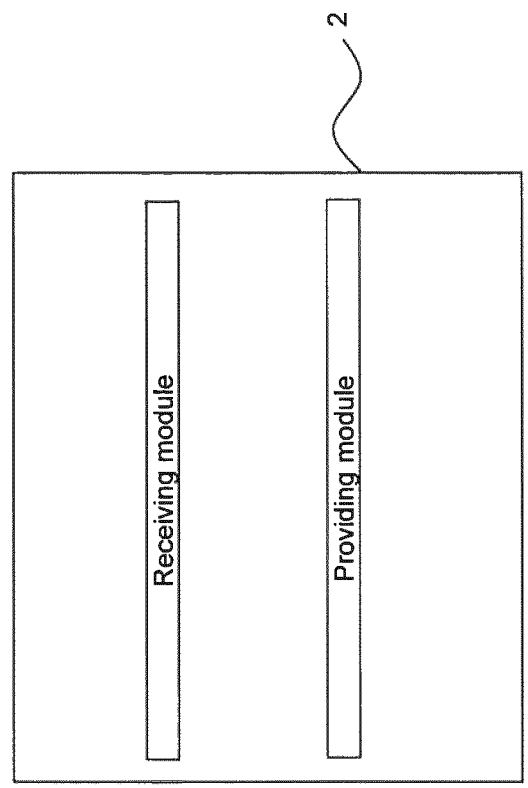
FIG. 17 is a block diagram schematically illustrating a further embodiment of an access network node.

FIG. 17 shows a functional block diagram of an access network node 2 configured in accordance with the principles of the disclosure as described above. The functional blocks of the access network node 2 may be implemented by hardware, software, or a combination of hardware and software to carry out the principles of the disclosure. It is understood by a person skilled in the art that the functional blocks described in FIG. 17 may be combined or separated into sub-blocks to implement the principles of the disclosure as described above. Therefore, the description herein may support any possible combination or separation or further definition of the functional blocks described herein. The access network node 2 of FIG. 17 is for providing a service from a wireless communication network associated with an operator to one or more end devices. The access network node 2 comprises a receiving module for receiving an instruction to provide a service with target performance characteristics to the one or more end devices. The service is requested by the one or more end devices to be provided with desired performance characteristics to the one or more end devices. The target performance characteristics are dependent on the desired performance characteristics and performance characteristics measurements associated with the one or more access network nodes. The access network node 2 further comprises a providing module for providing the service with the target performance characteristics to the one or more end devices.

Many advantages of the present disclosure will be fully understood from the foregoing description, and it will be apparent that various changes may be made in the form, construction and arrangement of the units and devices without departing from the scope of the present disclosure and/or without sacrificing all of its advantages. Since the present disclosure can be varied in many ways, it will be recognized that the present disclosure should be limited only by the scope of the following claims.

The invention claimed is:

1. A method of supporting provisioning of a service from a wireless communication network associated with an operator to one or more end devices, the method comprising:
   receiving, by a support system of the wireless communication network, a service request, the service request requesting the service to be provided with desired performance characteristics to the one or more end devices; and
   instructing, by the support system, one or more network entities of the wireless communication network to:
      receive, from a further network entity, at least one item of:
         a message on acceptable radio impact to achieve performance characteristics; and
         a message informing on targeted latency, jitter, and throughput for the one or more end devices in downlink and uplink directions, and instructing to monitor IP addresses to determine when to supervise the achieved performance characteristics;
      determine whether the achieved performance characteristics correspond to target performance characteristics;
      in response to the achieved performance characteristics being lower than the target performance characteristics, prioritize the one or more end devices, wherein the prioritization of the one or more end devices comprises reducing block error rates for the one or more end devices; or
      in response to the achieved performance characteristics being higher than the target performance characteristics, de-prioritize the one or more end devices, wherein the de-prioritization of the one or more end devices comprises increasing the block error rates for the one or more end devices; and
   provide the service with the target performance characteristics to the one or more end devices, the target performance characteristics being dependent on the desired performance characteristics and performance characteristics measurements associated with the one or more network entities.

2. The method of claim 1, further comprising, upon the receipt of the service request, locating the one or more network entities that are to provide the service.

3. The method of claim 1, wherein the service request further comprises at least one of: the number of the one or more end devices to which the service is to be provided, a geographical area for which the service is to apply, and IP addresses of a back-end system of the one or more end devices.

4. The method of claim 1, further comprising determining, by the support system, the target performance characteristics based on the desired performance characteristics and the performance characteristics measurements.

5. The method of claim 1, further comprising requesting, by the support system, the one or more network entities to report if the target performance characteristics are achieved.

6. The method of claim 1, further comprising assessing, by the support system, radio resource utilization in the one or more network entities.

7. The method of claim 1, further comprising defining and allocating, by the support system, one or more Quality of Service Class Identifier values to be used for the target performance characteristics.

8. The method of claim 1, further comprising associating, by the support system, the target performance characteristics with a pricing level to be charged for the provision of the service with the target performance characteristics.

9. A method of providing a service from a wireless communication network associated with an operator to one or more end devices, the method comprising:
   receiving, by one or more network entities of the wireless communication network, from a further network entity, at least one item of:
      a message on acceptable radio impact to achieve performance characteristics; and
      a message informing on targeted latency, jitter, and throughput for the one or more end devices in downlink and uplink directions, and instructing to monitor IP addresses to determine when to supervise the achieved performance characteristics;
   receiving, by the one or more network entities, an instruction to provide the service with target performance characteristics to the one or more end devices, the service being requested by the one or more end devices to be provided with desired performance characteristics to the one or more end devices, the target performance characteristics being dependent on the desired performance characteristics and performance characteristics measurements associated with the one or more network entities;

determining, by the one or more network entities, whether the achieved performance characteristics correspond to the target performance characteristics;

the one or more network entities:
prioritizing the one or more end devices, in response to the achieved performance characteristics being lower than the target performance characteristics, wherein prioritizing the one or more end devices comprises reducing block error rates for the one or more end devices; or de-prioritizing the one or more end devices, in response to the achieved performance characteristics being higher than the target performance characteristics, wherein de-prioritizing the one or more end devices comprises increasing the block error rates for the one or more end devices; and providing, by the one or more network entities, the service with the target performance characteristics to the one or more end devices.

10. The method of claim 9, further comprising, before performing the providing the service with the target performance characteristics, performing, by the one or more network entities, the performance characteristics measurements.

11. The method of claim 10, wherein the performing the performance characteristics measurements comprises at least one of:
carrying out the performance characteristics measurements by the one or more network entities; and
instructing, by the one or more network entities, the one or more end devices to carry out the performance characteristics measurements.

12. The method of claim 9, further comprising reporting, by the one or more network entities to a support system, the achieved performance characteristics of the one or more end devices served by the one or more network entities.

13. The method of claim 9, wherein the determining comprises monitoring traffic between the one or more network entities and the one or more end devices.

14. A method of providing a service from a wireless communication network associated with an operator to one or more end devices, the method comprising:
receiving, by one or more network entities of the wireless communication network, an instruction to:
receive, from a further network entity, at least one item of:
a message on acceptable radio impact to achieve performance characteristics; and
a message informing on targeted latency, jitter, and throughput for the one or more end devices in downlink and uplink directions, and instructing to monitor IP addresses to determine when to supervise the achieved performance characteristics;
determine whether the achieved performance characteristics correspond to target performance characteristics;
prioritize the one or more end devices, in response to the achieved performance characteristics being lower than the target performance characteristics, wherein the prioritization of the one or more end devices comprises reducing block error rates for the one or more end devices; or
de-prioritize the one or more end devices, in response to the achieved performance characteristics being higher than the target performance characteristics, wherein the de-prioritization of the one or more end devices comprises increasing the block error rates for the one or more end devices; and
provide the service with the target performance characteristics to the one or more end devices, the service being requested by the one or more end devices to be provided with desired performance characteristics to the one or more end devices, and the target performance characteristics being dependent on the desired performance characteristics and performance characteristics measurements associated with the one or more network entities; and
initiating, by the one or more network entities, to provide the service with the target performance characteristics to the one or more end devices.

15. A method of providing a service from a wireless communication network associated with an operator to one or more end devices, the method comprising:
providing, by one or more network entities of the wireless communication network, the service with target performance characteristics to the one or more end devices based on an instruction to:
receive, from a further network entity, at least one item of:
a message on acceptable radio impact to achieve performance characteristics; and
a message informing on targeted latency, jitter, and throughput for the one or more end devices in downlink and uplink directions, and instructing to monitor IP addresses to determine when to supervise the achieved performance characteristics;
determine whether the achieved performance characteristics correspond to the target performance characteristics;
prioritize the one or more end devices, in response to the achieved performance characteristics being lower than the target performance characteristics, wherein the prioritization of the one or more end devices comprises reducing block error rates for the one or more end devices; or
de-prioritize the one or more end devices, in response to the achieved performance characteristics being higher than the target performance characteristics, wherein the de-prioritization of the one or more end devices comprises increasing the block error rates for the one or more end devices; and
provide the service with the target performance characteristics to the one or more end devices, the service being requested by the one or more end devices to be provided with desired performance characteristics to the one or more end devices, the target performance characteristics being dependent on the desired performance characteristics and performance characteristics measurements associated with the one or more network entities.

16. The method of claim 15, further comprising, before the providing the service with the target performance characteristics, performing, by the one or more network entities, the performance characteristics measurements.

17. The method of claim 16, wherein the performing the performance characteristics measurements comprises at least one of:
carrying out the performance characteristics measurements by the one or more network entities; and
instructing, by the one or more network entities, the one or more end devices to carry out the performance characteristics measurements.

18. The method of claim 15, further comprising sending, by the one or more network entities, to a further network entity, at least one item of:
- a message with which information about a radio environment impact due to the one or more end devices is forwarded;
- a message with which Uplink (UL) data are forwarded and which indicates UL latency, jitter, and throughput; and
- a message indicating the extent to which Downlink latency, jitter, and throughput objectives are met with current radio impact.

19. The method of claim 15, further comprising receiving, by the one or more network entities, from a further network entity an item of a message informing to adjust Uplink link adaptation and scheduling, and a message informing about a specification about target latency, jitter, and throughput for a next data transmission to/from the one or more end devices.

20. The method of claim 15, further comprising receiving, by the one or more network entities, forwarded downlink data from a further network entity.

21. A method of providing a service from a wireless communication network associated with an operator to one or more end devices, the method comprising:
- receiving, by one or more network entities of the wireless communication network, from a further network entity, at least one item of:
  - a message on acceptable radio impact to achieve performance characteristics; and
  - a message informing on targeted latency, jitter, and throughput for the one or more end devices in downlink and uplink directions, and instructing to monitor IP addresses to determine when to supervise the achieved performance characteristics;
- determining, by the one or more network entities, whether the achieved performance characteristics correspond to target performance characteristics;
- in response to the achieved performance characteristics being lower than the target performance characteristics, the one or more network entities prioritizing the one or more end devices, wherein prioritizing the one or more end devices comprises reducing block error rates for the one or more end devices; or
- in response to the achieved performance characteristics being higher than the target performance characteristics, the one or more network entities de-prioritizing the one or more end devices, wherein de-prioritizing the one or more end devices comprises increasing the block error rates for the one or more end devices; and
- initiating, by the one or more network entities, to provide the service with the target performance characteristics to the one or more end devices based on an instruction to provide the service with the target performance characteristics to the one or more end devices, the service being requested by the one or more end devices to be provided with desired performance characteristics to the one or more end devices, the target performance characteristics being dependent on the desired performance characteristics and performance characteristics measurements associated with the one or more network entities.

22. The method of claim 21, further comprising receiving, by the one or more network entities, from a further network entity, at least one item of:
- a message with which information about a radio environment impact due to the one or more end devices is forwarded;
- a message with which Uplink (UL) data are forwarded and which indicates UL latency, jitter, and throughput; and
- a message indicating the extent to which Downlink latency, jitter, and throughput objectives are met with current radio impact.

23. The method of claim 21, wherein the determining comprises monitoring traffic between the one or more network entities and the one or more end devices.

24. A method of providing a service between a wireless communication network associated with an operator and one or more end devices, the method comprising:
- agreeing, between the one or more end devices and a support system of the wireless communication network, on providing the service with target performance characteristics to the one or more end devices, the service being requested by the one or more end devices to be provided with desired performance characteristics to the one or more end devices, the target performance characteristics being dependent on the desired performance characteristics and performance characteristics measurements associated with one or more network entities;
- receiving, by the one or more network entities, from a further network entity, at least one item of:
  - a message on acceptable radio impact to achieve performance characteristics; and
  - a message informing on targeted latency, jitter, and throughput for the one or more end devices in downlink and uplink directions, and instructing to monitor IP addresses to determine when to supervise the achieved performance characteristics;
- determining, by the one or more network entities, whether the achieved performance characteristics correspond to the target performance characteristics;
- the one or more network entities prioritizing the one or more end devices, in response to the achieved performance characteristics being lower than the target performance characteristics, wherein prioritizing the one or more end devices comprises moving the one or more end devices from a higher frequency channel to a lower frequency channel; or
- the one or more network entities de-prioritizing the one or more end devices, in response to the achieved performance characteristics being higher than the target performance characteristics, wherein de-prioritizing the one or more end devices comprises increasing the block error rates for the one or more end devices; and
- providing, by the one or more network entities, the service with the target performance characteristics to the one or more end devices.

25. The method of claim 24, wherein the agreeing comprises:
- requesting, by the one or more end devices, the service to be provided with the desired performance characteristics to the one or more end devices;
- offering, by the support system, to provide the service with the target performance characteristics to the one or more end devices; and
- accepting, by the one or more end devices, that the service is to be provided with the target performance characteristics.

26. A support system for a wireless communication network associated with an operator, the support system comprising:
- processing circuitry; and
- memory containing instructions executable by the processing circuitry, whereby the support system is operative to:
  - receive a service request, the service request requesting a service to be provided with desired performance characteristics to one or more end devices; and
  - instruct one or more network entities of the wireless communication network to:
    - receive, from a further network entity, at least one item of:
      - a message on acceptable radio impact to achieve performance characteristics; and
      - a message informing on targeted latency, jitter, and throughput for the one or more end devices in downlink and uplink directions, and instructing to monitor IP addresses to determine when to supervise the achieved performance characteristics;
    - determine whether the achieved performance characteristics correspond to target performance characteristics;
    - prioritize the one or more end devices, in response to the achieved performance characteristics being lower than the target performance characteristics, wherein the prioritization of the one or more end devices comprises reducing block error rates for the one or more end devices; or
    - de-prioritize the one or more end devices, in response to the achieved performance characteristics being higher than the target performance characteristics, wherein the de-prioritization of the one or more end devices comprises increasing the block error rates for the one or more end devices; and
    - provide the service with the target performance characteristics to the one or more end devices, the target performance characteristics being dependent on the desired performance characteristics and performance characteristics measurements associated with the one or more network entities.

27. A network entity for a wireless communication network associated with an operator, the network entity comprising:
- processing circuitry; and
- memory containing instructions executable by the processing circuitry, whereby the network entity is operative to:
  - receive an instruction to:
    - receive, from a further network entity, at least one item of:
      - a message on acceptable radio impact to achieve performance characteristics; and
      - a message informing on targeted latency, jitter, and throughput for the one or more end devices in downlink and uplink directions, and instructing to monitor IP addresses to determine when to supervise the achieved performance characteristics;
    - determine whether the achieved performance characteristics correspond to target performance characteristics;
    - prioritize the one or more end devices, in response to the achieved performance characteristics being lower than the target performance characteristics, wherein the prioritization of the one or more end devices comprises reducing block error rates for the one or more end devices; or
    - de-prioritize the one or more end devices, in response to the achieved performance characteristics being higher than the target performance characteristics, wherein the de-prioritization of the one or more end devices comprises increasing the block error rates for the one or more end devices; and
    - provide a service with the target performance characteristics to the one or more end devices, the service being requested by the one or more end devices to be provided with desired performance characteristics to the one or more end devices, the target performance characteristics being dependent on the desired performance characteristics and performance characteristics measurements associated with the one or more network entities; and
  - provide the service with the target performance characteristics to the one or more end devices.

28. A network entity for providing a service from a wireless communication network associated with an operator to one or more end devices, the network entity comprising:
- processing circuitry; and
- memory containing instructions executable by the processing circuitry, whereby the network entity is operative to:
  - receive an instruction to provide the service with target performance characteristics to the one or more end devices based on an instruction to:
    - receive, from a further network entity, at least one item of:
      - a message on acceptable radio impact to achieve performance characteristics; and
      - a message informing on targeted latency, jitter, and throughput for the one or more end devices in downlink and uplink directions, and instructing to monitor IP addresses to determine when to supervise the achieved performance characteristics;
    - determine whether the achieved performance characteristics correspond to the target performance characteristics;
    - prioritize the one or more end devices, in response to the achieved performance characteristics being lower than the target performance characteristics, wherein the prioritization of the one or more end devices comprises reducing block error rates for the one or more end devices; or
    - de-prioritize the one or more end devices, in response to the achieved performance characteristics being higher than the target performance characteristics, wherein the de-prioritization of the one or more end devices comprises increasing the block error rates for the one or more end devices; and
    - provide the service with the target performance characteristics to the one or more end devices, the service being requested by the one or more end devices to be provided with desired performance characteristics to the one or more end devices, the target performance characteristics being dependent on the desired performance characteristics and performance characteristics measurements associated with the one or more network entities.

29. A wireless communication network operated by an operator, the wireless communication network comprising:
a support system; and
one or more network entities, including a first network entity,
wherein the support system comprises:
first processing circuitry; and
first memory containing instructions executable by the first processing circuitry, whereby the support system is operative to:
receive a service request, the service request requesting a service to be provided with desired performance characteristics to one or more end devices; and
instruct the one or more network entities to:
receive, from a further network entity, at least one item of:
a message on acceptable radio impact to achieve performance characteristics; and
a message informing on targeted latency, jitter, and throughput for the one or more end devices in downlink and uplink directions, and instructing to monitor IP addresses to determine when to supervise the achieved performance characteristics;
determine whether the achieved performance characteristics correspond to target performance characteristics;
prioritize the one or more end devices, in response to the achieved performance characteristics being lower than the target performance characteristics, wherein the prioritization of the one or more end devices comprises reducing block error rates for the one or more end devices; or
de-prioritize the one or more end devices, in response to the achieved performance characteristics being higher than the target performance characteristics, wherein the de-prioritization of the one or more end devices comprises increasing the block error rates for the one or more end devices; and
provide the service with the target performance characteristics to the one or more end devices, the target performance characteristics being dependent on the desired performance characteristics and performance characteristics measurements associated with the one or more network entities; and
wherein the first network entity comprises:
second processing circuitry; and
second memory containing instructions executable by the second processing circuitry, whereby the first network entity is operative to:
receive an instruction to:
receive, from a further network entity, at least one item of:
a message on acceptable radio impact to achieve performance characteristics; and
a message informing on targeted latency, jitter, and throughput for the one or more end devices in downlink and uplink directions, and instructing to monitor IP addresses to determine when to supervise the achieved performance characteristics;
determine whether the achieved performance characteristics correspond to the target performance characteristics;
prioritize the one or more end devices, in response to the achieved performance characteristics being lower than the target performance characteristics, wherein the prioritization of the one or more end devices comprises reducing the block error rates for the one or more end devices; or
de-prioritize the one or more end devices, in response to the achieved performance characteristics being higher than the target performance characteristics, wherein the de-prioritization of the one or more end devices comprises increasing the block error rates for the one or more end devices; and
provide the service with the target performance characteristics to the one or more end devices.

* * * * *